(12) United States Patent
Ohara et al.

(10) Patent No.: US 9,176,696 B2
(45) Date of Patent: Nov. 3, 2015

(54) RELAY APPARATUS, IMAGE PROCESSING APPARATUS AND COMMUNICATION SYSTEM

(71) Applicants: Kiyotaka Ohara, Nagoya (JP); Takeshi Miyake, Nagoya (JP)

(72) Inventors: Kiyotaka Ohara, Nagoya (JP); Takeshi Miyake, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/211,111

(22) Filed: Mar. 14, 2014

(65) Prior Publication Data

US 2014/0268236 A1 Sep. 18, 2014

(30) Foreign Application Priority Data

Mar. 15, 2013 (JP) ................................ 2013-053992

(51) Int. Cl.
*G06F 15/00* (2006.01)
*G06F 3/12* (2006.01)
*H04N 1/00* (2006.01)
*H04L 29/08* (2006.01)

(52) U.S. Cl.
CPC .............. *G06F 3/129* (2013.01); *G06F 3/1224* (2013.01); *H04L 67/26* (2013.01); *H04N 1/00244* (2013.01); *H04N 1/00344* (2013.01); *H04L 67/141* (2013.01); *H04N 2201/0015* (2013.01); *H04N 2201/0039* (2013.01); *H04N 2201/0094* (2013.01)

(58) Field of Classification Search
CPC ........................ H04L 67/26; H04N 2201/0039
USPC ....................................................... 358/1.15
See application file for complete search history.

(56) References Cited

U.S. PATENT DOCUMENTS

| | | |
|---|---|---|
| 6,954,720 B2 | 10/2005 | Oya |
| RE42,166 E | 2/2011 | Oya |
| 2004/0186694 A1 | 9/2004 | Oya |
| 2012/0030746 A1 | 2/2012 | Sng et al. |
| 2012/0218599 A1* | 8/2012 | Kashioka ..................... 358/1.15 |

FOREIGN PATENT DOCUMENTS

JP 2004-220214 A 8/2004

OTHER PUBLICATIONS

Feb. 13, 2015—(EP) Extended Search Report—App 14160050.2.

* cited by examiner

*Primary Examiner* — Saeid Ebrahimi Dehkordy
(74) *Attorney, Agent, or Firm* — Banner & Witcoff, Ltd.

(57) ABSTRACT

A relay apparatus includes a processor and a network interface for performing communication with an image processing apparatus and a server apparatus through a network. The processor functions as: a server-request-information receiving unit for receiving server request information transmitted to the relay apparatus by the server apparatus; an establishment request information receiving unit for receiving establishment request information transmitted by the image processing apparatus for requesting establishment of a session between the relay apparatus and the image processing apparatus according to a session establishment type first protocol for enabling server-push for transmitting the server request information to the image processing apparatus; and a server-request-information transmitting unit for transmitting the server request information received by the server-request-information receiving unit to the image processing apparatus by using the session established between the relay apparatus and the image processing apparatus.

22 Claims, 9 Drawing Sheets

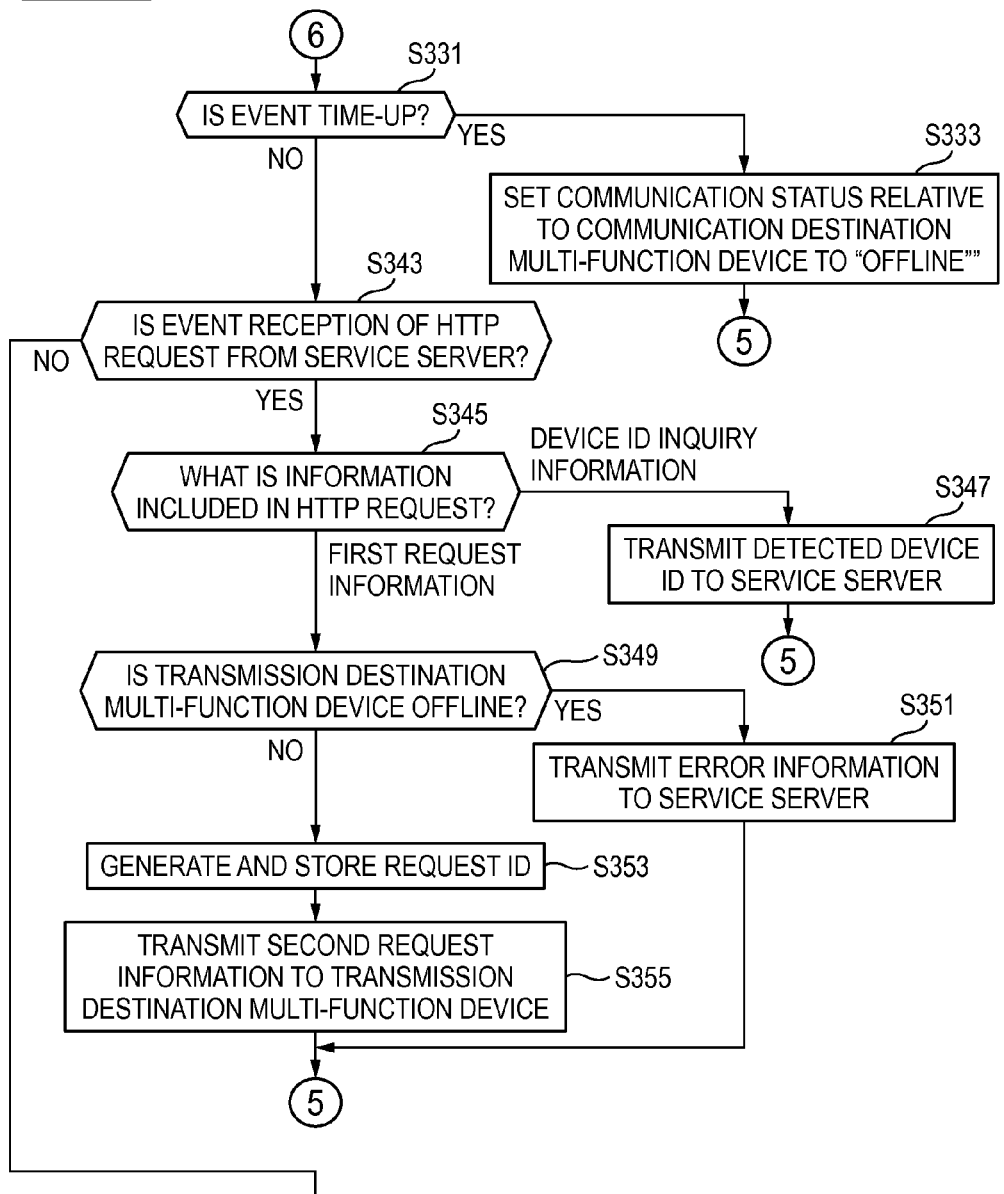

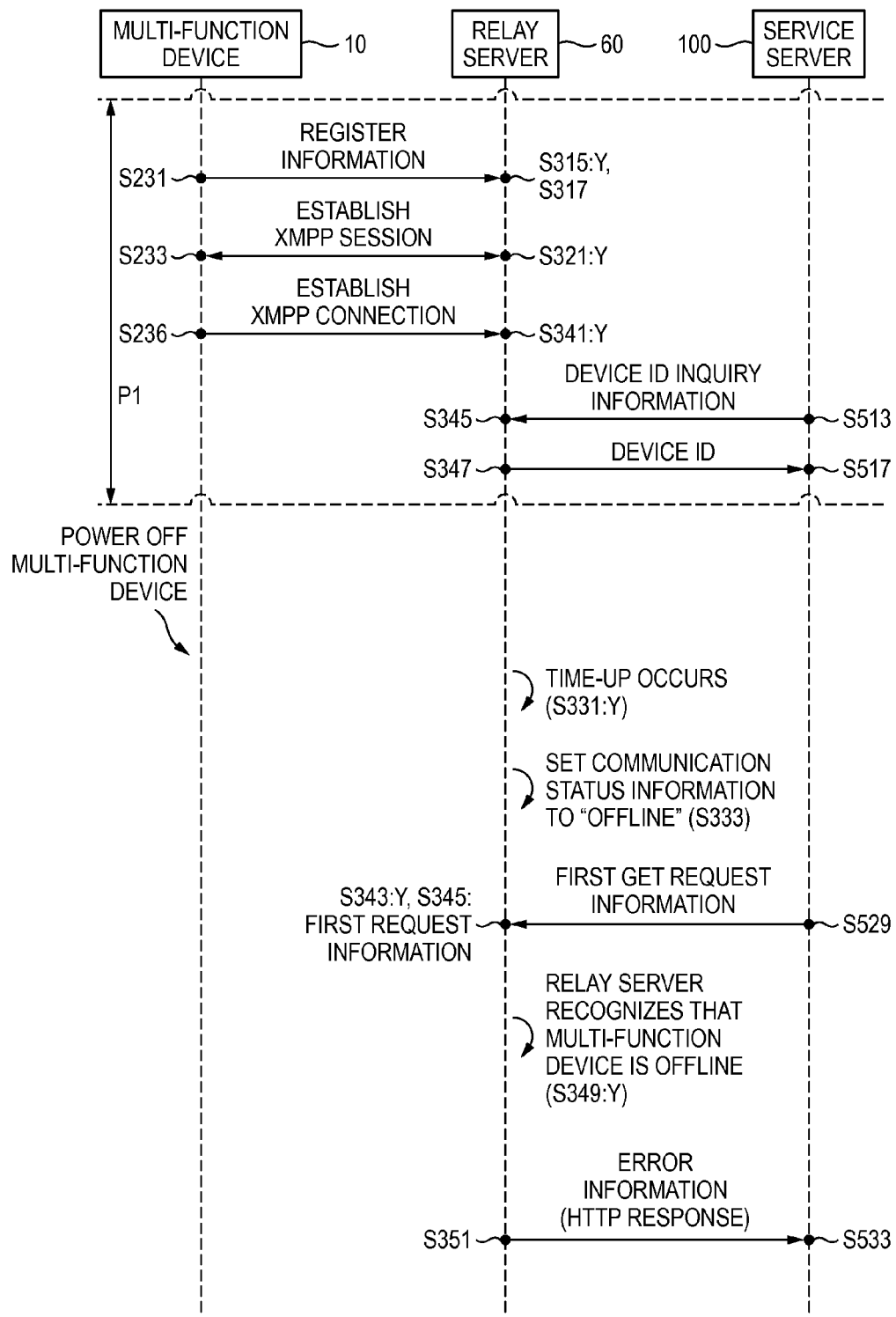

RELAY APPARATUS, IMAGE PROCESSING APPARATUS AND COMMUNICATION SYSTEM

CROSS-REFERENCE TO RELATED APPLICATIONS

This application claims priority from Japanese Patent Application No. 2013-053992 filed on Mar. 15, 2013, the entire subject matter of which is incorporated herein by reference.

TECHNICAL FIELD

This disclosure relates to a relay apparatus which is connected to an image processing apparatus and a server apparatus through a network, and the like.

BACKGROUND

There has been proposed a system in which an image processing apparatus having a printing function, a facsimile function, and the like, and a management apparatus for managing the image processing apparatus are connected to each other through the Internet.

SUMMARY

In order to use a management apparatus to provide a push service such as a maintenance and inspection service to receive a variety of information from an image processing apparatus and perform maintenance and inspection or a remote setting service to change a variety of options of an image processing apparatus, when a timing to provide the push service on the management apparatus side comes, it may be wanted to transmit information relating to the push service from the management apparatus to the image processing apparatus through the Internet. However, in a case that a firewall has been set to prevent an unauthorized access or hacking, an access from the management apparatus to the image processing apparatus may be blocked. Further, in a case that the image processing apparatus is under control of NAT (an abbreviation for Network address translation), it may not be possible to access from the management apparatus side to the image processing apparatus.

Therefore, according to the disclosure, there is provided a relay apparatus comprising: a network interface configured to perform communication with an image processing apparatus and a server apparatus through a network; a processor; a memory storing instructions, the instructions, when executed by the processor, causing the relay apparatus to perform: receiving, via the network interface, server request information transmitted from the server apparatus, the server request information representing a request to the image processing apparatus; receiving, via the network interface, establishment request information transmitted from the image processing apparatus, the establishment request information requesting establishment of a session between the relay apparatus and the image processing apparatus according to a session establishment type first protocol for enabling server-push for transmitting the server request information to the image processing apparatus; and transmitting, via the network interface, the server request information to the image processing apparatus by using the session established between the relay apparatus and the image processing apparatus, in a case that the session between the relay apparatus and the image processing apparatus is established when the server request information is received.

According to the relay apparatus, the image processing apparatus, and the communication system disclosed as an illustrative embodiment in this specification, the session established between the image processing apparatus and the relay apparatus is used to enable server-push, and if a timing to provide a push service comes at the server apparatus side, it becomes possible to perform server-push for transmitting the server request information from the server apparatus to the image processing apparatus through the relay apparatus. Therefore, whenever it becomes a timing to provide the push service comes at the server apparatus side, it is possible to provide the push service to the image processing apparatus by the server-push.

According to the relay apparatus and the like disclosed as an illustrative embodiment in this specification, it becomes possible to transmit server request information from the server apparatus to an image processing apparatus connected to a first network, through the relay apparatus connected to the first network through a communication control apparatus. Therefore, it is possible to always provide the push service to the image processing apparatus connected to the first network.

According to the relay apparatus and the like disclosed as an illustrative embodiment in this specification, it becomes possible to transmit server request information from the server apparatus to the plurality of image processing apparatuses through the relay apparatus having established a session enabling server-push between the relay apparatus and each of the plurality of image processing apparatuses. Therefore, it is possible to always provide the push service to the plurality of image processing apparatuses.

According to the relay apparatus and the like disclosed as an illustrative embodiment in this specification, it becomes possible to transmit server request information to an image processing apparatus, which the server apparatus side designates, of a plurality of image processing apparatuses having established sessions enabling server-push, through the relay apparatus having stored the identification information of each of the plurality of image processing apparatuses having established the sessions with the relay apparatus. Therefore, it is possible to always provide the push service to the image processing apparatus which the server apparatus side designates.

According to the relay apparatus and the like disclosed as an illustrative embodiment in this specification, it becomes possible to transmit server request information which the server apparatus has transmitted by using a second protocol different from the first protocol, to an image processing apparatus through the relay apparatus by using the first protocol. Therefore, the server apparatus can always provide the push service to an image processing apparatus, without a necessity for the server apparatus to cope with the first protocol.

According to the relay apparatus and the like disclosed as an illustrative embodiment in this specification, it becomes possible to transmit server request information which has been transmitted from the server apparatus by using a sessionless type protocol, to an image processing apparatus through the relay apparatus by using the first protocol, without a necessity to establish a session between the server apparatus and the relay apparatus. Therefore, it is possible to always provide the push service to an image processing apparatus, without a necessary to apply a load for establishing a session for performing server-push, on the server apparatus.

According to the relay apparatus and the like disclosed as an illustrative embodiment in this specification, it becomes possible to transmit response information which an image processing apparatus has transmitted in response to server request information, as response data relative to a session-less type protocol used for transmission of the server request information from the server apparatus side, to the server apparatus through the relay apparatus, without a necessary to establish a session between the server apparatus and the relay apparatus. Therefore, it is possible to always provide the push service relative to the response information, without a necessary to apply a load for establishing a session between the server apparatus and the relay apparatus.

According to the relay apparatus and the like disclosed as an illustrative embodiment in this specification, it becomes possible to transmit response information which an image processing apparatus has transmitted in response to server request information, to the server apparatus through the relay apparatus. Therefore, it is possible to always provide the push service relative to the response information.

According to the relay apparatus and the like disclosed as an illustrative embodiment in this specification, it becomes possible to transmit response information which an image processing apparatus has transmitted in response to server request information by using a third protocol different from the first protocol, to the server apparatus through the relay apparatus, without a necessity to use a session established between the image processing apparatus and the relay apparatus. Therefore, it is possible to always provide the push service relative to response information, without using a session for enabling server-push for transmission of the response information which is an object different from server-push.

According to the relay apparatus and the like disclosed as an illustrative embodiment in this specification, it becomes possible to transmit response information, which an image processing apparatus has transmitted by using a session-less type protocol in response to server request information, to the server apparatus through the relay apparatus, without a necessity to newly establish a session between the image processing apparatus and the relay apparatus. Therefore, it is possible to always provide the push service related to the response information, without a necessity to apply a load for establishing a session to transmit the response information.

According to the relay apparatus and the like disclosed as an illustrative embodiment in this specification, it becomes possible to transmit response information which an image processing apparatus has transmitted by using a session-less type protocol in response to server request information, as response data relative to a session-less type protocol used for transmission of the server request information from the server apparatus side, to the server apparatus through the relay apparatus, without a necessity to newly establish a session between the image processing apparatus and the relay apparatus. Therefore, it is possible to always provide the push service relative to the response information, without a necessity to apply a load for establishing a session to transmit the response information and without a necessary to apply a load for establishing a session between the server apparatus and the relay apparatus.

According to the relay apparatus and the like disclosed as an illustrative embodiment in this specification, it is possible to recognize whether specific server request information which has been transmitted from the server apparatus side by using the session-less type second protocol, and response information which an image processing apparatus has transmitted in response to the specific server request information having been transmitted to a communication destination image processing apparatus by using the session establishment type first protocol are information items having a correspondence relation of a pair of a request and a response corresponding to each other. Therefore, it becomes possible to transmit response information from the communication destination image processing apparatus to the server apparatus which is the transmission source of specific server request information. Therefore, it is possible to provide a push service relative to response information correctly corresponding to specific server request information, without a load for establishing a session enabling server-push directly between the server apparatus and an image processing apparatus. Further, even if there is a plurality of server apparatuses, it is possible to use a server apparatus which is the transmission source, to provide a push service relative to response information correctly corresponding to the specific server request information, without a load to establish a session enabling server-push directly between the plurality of server apparatuses and an image processing apparatus. Further, even if there is a plurality of image processing apparatuses, it is possible to use a server apparatus which is the transmission source, to always provide a push service relative to response information correctly corresponding to the specific server request information, without a load to establish a session enabling server-push directly between a server apparatus and the plurality of image processing apparatuses.

According to the relay apparatus and the like disclosed as an illustrative embodiment in this specification, in a case that it is impossible to transmit specific server request information to a communication destination image processing apparatus, error information is transmitted to the server apparatus, whereby a session-less type connection normally finishes. Therefore, it is possible to prevent occurrence of situations, like a situation in which the server apparatus having transmitted specific server request information waits for reply of response information until a time-out occurs, or a situation in which the server apparatus having transmitted the response information determines that a time-out has occurred, and repeats transmission of the specific server request information, which occur if a connection does not normally finish, and become loads on the server apparatus, the relay apparatus, and a second network. Therefore, it is possible to always provide the push service, without a load occurring due to abnormal finish of a connection.

According to the relay apparatus and the like disclosed as an illustrative embodiment in this specification, response data relative to a session-less type connection is transmitted to a communication destination image processing apparatus, whereby the session-less type connection is normally finished. Therefore, it is possible to prevent occurrence of situations, like a situation in which the communication destination image processing apparatus having transmitted the response information waits for reply of response data until a time-out occurs, or a situation in which the communication destination image processing apparatus having transmitted the response information determines that a time-out has occurred, and repeats transmission of the response information, which occur if a connection does not normally finish, and become loads on the communication destination image processing apparatus, the relay apparatus, and a first network. Therefore, it is possible to always provide a push service relative to response information, without a load occurring due to abnormal finish of a connection.

According to the relay apparatus and the like disclosed as an illustrative embodiment in this specification, it becomes possible to transmit response information from the communication destination image processing apparatus to the server apparatus which is the transmission source of specific server request information, without a necessity to apply a load for generating first identification information, on the server apparatus. Therefore, it is possible to provide a push service relative to response information correctly corresponding to specific server request information, without a necessity to apply a load for generating first identification information, on the server apparatus.

According to the relay apparatus and the like disclosed as an illustrative embodiment in this specification, it is possible to transmit server request information having been transmitted from the server apparatus by using HTTP, to an image processing apparatus through the relay apparatus by using the first protocol. Therefore, it is possible to always provide the push service by using HTTP which is generally used in apparatuses connected to the Internet, without a necessity for the server apparatus to cope with the first protocol.

According to the relay apparatus and the like disclosed as an illustrative embodiment in this specification, it is possible to transmit response information which an image processing apparatus has transmitted in response to server request information by using HTTP, to the server apparatus through the relay apparatus, without a necessity to use a session established between the image processing apparatus and the relay apparatus. Therefore, it is possible to provide a push service corresponding to response information by using HTTP which is generally used in apparatuses connected to the Internet, without a necessity to an image processing apparatus and the relay apparatus to cope with a new protocol only for communication of the response information. Further, it is possible to always provide a push service corresponding to response information by using a configuration which is for performing a process relative to HTTP and which is included in every apparatus capable of using the push service by using HTTP, for example, a protocol stack for performing a process of HTTP. Therefore, it is convenient.

According to the relay apparatus and the like disclosed as an illustrative embodiment in this specification, it becomes possible to transmit server request information from the server apparatus side to an image processing apparatus through the relay apparatus, by using a session established between the image processing apparatus and the relay apparatus, based on XMPP over BOSH, and enabling server-push. XMPP over BOSH is a protocol based on HTTP. Therefore, it is possible to provide a push service corresponding to response information, by using a configuration for performing a process relative to HTTP which is generally used in apparatuses connected to the Internet, for example, a protocol stack for performing a process of HTTP. Therefore, it is convenient.

According to the image processing apparatuses and the like disclosed as an illustrative embodiment in this specification, a session established between an image processing apparatus and the relay apparatus is used to enable server-push, whereby it becomes possible to perform server-push for transmitting server request information from the server apparatus to the image processing apparatus through the relay apparatus. Therefore, it is possible to provide the push service to the image processing apparatus by the server-push.

According to the image processing apparatuses and the like disclosed as an illustrative embodiment in this specification, even if a predetermined time elapses after server-push becomes possible between the multi-function device and the relay server, the state in which the server-push from the relay server is possible is maintained. As a result, it becomes possible to always provide the push service by using the session establishment type protocol.

According to the image processing apparatuses and the like disclosed as an illustrative embodiment in this specification, even if a session between an image processing apparatus and the relay apparatus, it is possible to newly establish the session. As a result, it becomes possible to always provide the push service by using the session establishment type protocol.

According to the image processing apparatuses and the like disclosed as an illustrative embodiment in this specification, even if a connection between an image processing apparatus and the relay apparatus, it is possible to newly establish the connection. As a result, it becomes possible to always provide the push service by using the session establishment type protocol, without a load for establishing a session.

According to the image processing apparatuses and the like disclosed as an illustrative embodiment in this specification, it becomes possible to transmit response information which an image processing apparatus has transmitted in response to server request information, to the server apparatus by using a session-less type protocol. Therefore, it is possible to always provide the push service relative to response information, without using a session for enabling the push service for transmission of the response information which is an object different from server-push.

According to the image processing apparatuses and the like disclosed as an illustrative embodiment in this specification, it is possible to recognize whether server request information which has been transmitted from the server apparatus side by using the session-less type second protocol, and response information which an image processing apparatus has transmitted in response to the server request information are information items having a correspondence relation of a pair of a request and a response corresponding to each other. Therefore, it becomes possible to transmit response information from the image processing apparatus to the server apparatus which is the transmission source of server request information.

According to the image processing apparatuses and the like disclosed as an illustrative embodiment in this specification, even through a session between an image processing apparatus and the relay apparatus has been cut, in a case that the image processing apparatus is in a session maintenance mode, establishment request information is transmitted from the image processing apparatus, whereby it is possible to establish the session again. As a result, it becomes possible to always provide the push service by using the session establishment type protocol.

According to the image processing apparatuses and the like disclosed as an illustrative embodiment in this specification, in a case that an image processing apparatus is in the session maintenance mode, it is possible to establish a session when the image processing apparatus is activated. As a result, it becomes possible to always provide the push service by using the session establishment type protocol from the time of activating the image processing apparatus.

According to the image processing apparatuses and the like disclosed as an illustrative embodiment in this specification, the mode information representing that an image processing apparatus is in the session maintenance mode is stored in the storage unit during manufacturing of the image processing apparatus. As a result, when the image processing apparatus is activated, it is possible to establish a session. Therefore, the manufacture side or sales side of the image processing apparatuses, such as a vendor or a dealer can determine an image processing apparatus desired to always receive the push service, and enables the determined image processing apparatus to use the push service.

According to the image processing apparatuses and the like disclosed as an illustrative embodiment in this specification, it is possible to establish a session of the first protocol which is a higher-level protocol than the second protocol, by using the second protocol which is used for using a pull service. Therefore, it becomes possible to always provide the pull service, without a necessity for an image processing apparatus and the relay server to cope with a new protocol only for establishing a session.

According to the image processing apparatuses and the like disclosed as an illustrative embodiment in this specification, it is possible to use HTTP which is used for using the pull service, to establish a session for enabling server-push which is a higher-level protocol. Therefore, it is possible to provide a push service corresponding to response information, by using a configuration for performing a process relative to HTTP which is generally used in apparatuses connected to the Internet, for example, a protocol stack for performing a process of HTTP. Therefore, it is convenient.

Communication systems for implementing the above described technologies are also new and useful.

BRIEF DESCRIPTION OF THE DRAWINGS

FIGS. 5A and 5B are the flow charts of processes performed by the relay server;

FIG. 8 is a flow chart illustrating a second operation example of the communication system.

DETAILED DESCRIPTION

<Configuration of System>

Figure 1:
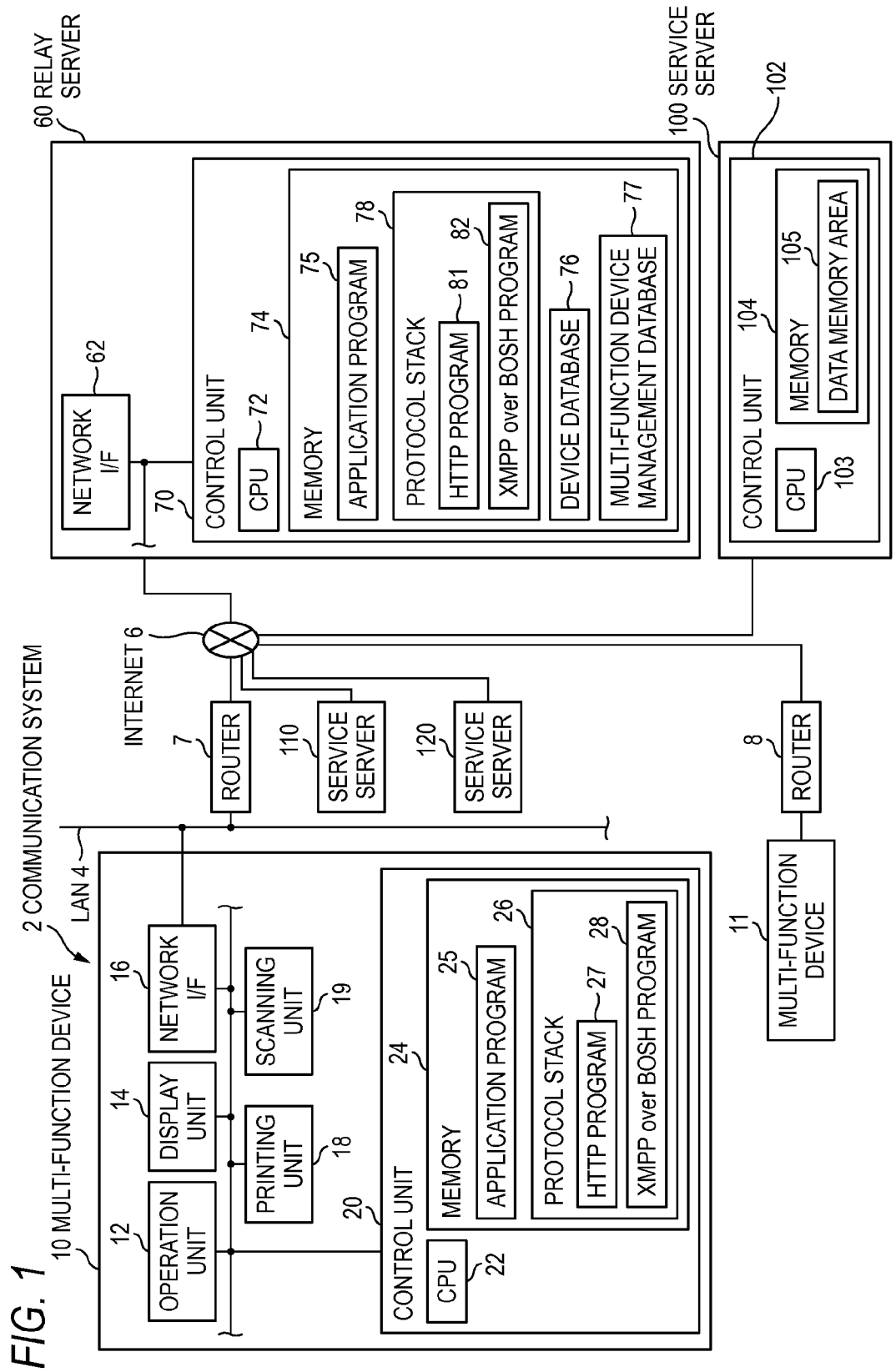
FIG. 1 shows the configuration of a communication system.

As shown in FIG. 1, a communication system 2 includes routers 8 and 9, multi-function devices 10 and 11, a relay server 60, and service servers 100, 110, and 120. The multi-function device 10 is connected to the Internet 6 through a LAN 4 and the router 7. The multi-function device 11 is connected to the Internet 6 through the router 8. Further, the relay server 60 and the service servers 100, 110, and 120 are connected to the Internet 6.

<Configuration of Multi-Function Device>

The multi-function device 10 can perform multiple functions such as a printing function, a scanning function, a copying function, and a facsimile function. The multi-function device 10 includes an operation unit 12, a display unit 14, a network interface 16, a printing unit 18, a scanning unit 19, and a control unit 20. The operation unit 12 has a plurality of keys. A user can operate the operation unit 12, thereby inputting a variety of instructions to the multi-function device 10. The display unit 14 is a display for displaying a variety of information. The network interface 16 is connected to the router 7 through the LAN 4. The printing unit 18 has a printing mechanism of an inkjet type, a laser type, or the like. The scanning unit 19 has a scanning mechanism such as a CCD or a CIS. The control unit 20 includes a CPU 22 and a memory 24. The memory 24 stores an application program 25 and a protocol stack 26. The memory 24 may be a computer-readable storage medium. Examples of the computer-readable storage medium include a non-transitory medium such as a ROM, a RAM, a flash memory, or a hard disk. An electric signal for carrying a program to be downloaded from a server or the like set on the Internet is not included in the non-transitory medium. The CPU 22 performs an application process for always using a push service (to be described below) which the service servers 100 and 120 provide, according to the application program 25 stored in the memory 24. The CPU 22 performs a protocol process such as HTTP (an abbreviation for Hyper Text Transfer Protocol), or XMPP over BOSH (an abbreviation for eXtensible Messaging and Presence Protocol over Bidirectional-streams Over Synchronous HTTP). The CPU 22 performs the protocol process, thereby performing session establishment according to XMPP over BOSH, and connection establishment according to HTTP, which will be described below.

The protocol stack 26 includes an HTTP program 27 for performing an HTTP process which is a protocol process of HTTP, and an XMPP over BOSH program 28 for performing an XMPP over BOSH process which is a protocol process of XMPP over BOSH. In the XMPP over BOSH process, the CPU 22 transmits HTTP request information, which includes a variety of information according to XMPP over BOSH, or HTTP response information through the HTTP process. In a case that the network interface 16 receives HTTP request information including a variety of information according to XMPP over BOSH, or HTTP response information, in an XMPP over BOSH process, the CPU 22 receives the HTTP request information or the HTTP response information through the HTTP process. A session according to XMPP over BOSH will also be referred to as an XMPP session. Further, a connection according to HTTP will also be referred to as an HTTP connection or a TCP connection. Incidentally, XMPP over BOSH is an example of a session establishment type protocol (to be described below). Further, HTTP is an example of a session-less type protocol (to be described below).

The CPU 22 receives transmission information by an application process, and transmits the received transmission information from the network interface 16 through a protocol process by using XMPP over BOSH, HTTP, or the like. Further, in a case that the network interface 16 receives reception information, the CPU 22 receives the reception information through a protocol process in an application process. In a case that an event which needs to be notified in the application process occurs by the protocol process, the CPU 22 outputs event information by the protocol process. In the application process, the CPU 22 can recognize the event having occurred in the protocol process, on the basis of the event information. In a case that a session or a connection is established in the protocol process, the CPU 22 transmits information for identifying the established session or connection, in the application process. Examples of the information for identifying the established session or connection include socket information.

The memory 24 stores mode information, session maintenance information, and so on (to be described below). The mode information is information representing whether a session maintenance mode is in an ON state or an OFF state. The session maintenance mode is a mode in which the multi-function device 10 establishes an XMPP session between the multi-function device 10 and the relay server 60 and maintains the session so as to be able to use a variety of push services (to be described below) which the service servers 100 and 120 provide. The mode information may be stored in the memory 24 at the time of manufacturing of the multi-function device 10. The time of manufacturing is not limited to the time of manufacturing the product in a factory of the vendor. For example, a case that the dealer of the multi-function device 10 performs pre-shipment setting on the multi-function device 10 on the occasion of shipping the multi-function device 10 to a customer is also included in the time of manufacturing. The session maintenance information is information for establishing an XMPP session with the relay server 60. The session maintenance information may include the IP address of the relay server 60. Incidentally, the multi-function device 10 can use HTTP to use a pull service (to be described below) which the service server 110 provides.

Matters to be attended with respect to expressions in this specification will be described. In this specification, the expression "a CPU 72 of the relay server 60 receives a variety of information" includes the technology content "the CPU 72 of the relay server 60 receives a variety of information via a network interface 62". Further, the expression "the CPU 72 of the relay server 60 transmits a variety of information" includes the technology content "the CPU 72 of the relay server 60 outputs a variety of information via the network interface 62". Incidentally, the same matters to be attended exist even with respect to the CPU 22 and the network interface 16 of the multi-function device 10.

Here, the definitions of the terms "data" and "information" are described. Of the terms "data" and "information", the term "information" is used as a broader concept than the term "data". Therefore, "A data" can be restated as "A information". Further, "B data" obtained by duplicating or converting the "A data" is "A information" as long as the "B data" is used with the same meaning as that of the "A data".

<Configuration of Relay Server>

The relay server 60 is a server configured separately from the service servers 100, 110, and 120. The relay server 60 is a server for relaying accesses from the service servers 100 and 120 to the multi-function device 10 or 11. The relay server 60 is a server which is provided by the vendor of the multi-function devices 10 and 11. The relay server 60 includes the network interface 62 and a control unit 70.

The control unit 70 includes the CPU 72 and a memory 74. The memory 74 stores an application program 75, a device database 76, a multi-function device management database 77, and a protocol stack 78. Similarly to the memory 24, the memory 74 may be a computer-readable storage medium. The protocol stack 78 includes an HTTP program 81 and an XMPP over BOSH program 82. The CPU 72 performs an application program for enabling the multi-function devices 10 and 11 to always use the push services which the service servers 100 and 120 provide, according to the application program 75. A protocol process which the CPU 72 performs according to the protocol stack 78, cooperation between the protocol process and the application process, and the like are based on the contents described with respect to the multi-function device 10. The device database 76 is a database for receiving and storing register information (to be described below) from the multi-function devices 10 and 11. The multi-function device management database 77 is an area for storing communication statuses and request IDs. The communication statuses are information items representing whether the multi-function devices 10 and 11 are in an online state or in an off-line state, respectively. The online state is a state in which there is an XMPP session (to be described below) established between the multi-function device 10 or 11 and the relay server 60. The offline state is a state in which there is no XMPP session established between the multi-function device 10 or 11 and the relay server 60. The request IDs are information items which are generated in STEP S353 (to be described below). The request IDs are generated with respect to the multi-function devices 10 and 11, respectively.

<Pull Service, Push Service and Functions of Router>

The pull service and push service of the communication system 2 will be described. The pull service is a service having a form in which an apparatus "A" to use the service is used to request the service from a server "B" for providing the service, whereby the device "A" uses the service which the server "B" provides. An example of the pull service is a download service in which, in response to the device "A" transmitting request information for requesting download of content data such as image data stored in the server "B", the server "B" replies with the content data. Another example of the pull service is an upload service in which in response to the device "A" transmitting content data together with request information for requesting upload, the server "B" receives the content data and the request information and stores the content data. In the communication system 2, the multi-function device 10 corresponds to the device "A" to use the pull service. The service server 110 different from the service server 100 corresponds to the server "B" for providing the pull service.

In a case of the pull service, in a case that HTTP request information including request information and designating the service server 110 as a transmission destination is transmitted from the multi-function device 10, the router 7 receives the HTTP request information, and transmits HTTP request information to the Internet 6. At this time, the router 7 stores information for identifying the transmitted HTTP request information, information representing the private IP address of the multi-function device 10, and the like. Further, the HTTP request information transmitted by the router 7 includes a variety of information, such as information for identifying the HTTP request information transmitted by the router 7, and the IP address of the router 7. In response to receiving the HTTP request information including request data, the service server 110 transmits HTTP response information including content data according to the request information, as a response to the router 7. Incidentally, the HTTP response information which is transmitted as a response includes a variety of information such as information for identifying which HTTP request information the HTTP response information is a response to. In response to receiving the HTTP response information, the router 7 specifies that the HTTP response information is response information to the HTTP request information transmitted by the multi-function device 10, on the basis of the information included in the HTTP response information, and the information stored at the time of transmitting the HTTP request information. Since the HTTP response information is response information to the HTTP request information transmitted by the multi-function device 10, the router 7 uses the private IP address of the multi-function device 10 to transmit the HTTP response information.

If the service server 110 transmits HTTP request information designating the multi-function device 10 as a transmission destination, the router 7 receives the HTTP request information, but the router 7 is unable to specify that the HTTP request information is response information to the information transmitted by the multi-function device 10. Since the HTTP request information is not response information to the information transmitted by the multi-function device 10, the router 7 does not transmit the HTTP request information to the multi-function device 10.

As described above, in a case that the router 7 receives information from an apparatus set on the Internet (6) side, in a case that the received information is response information to information whose transmission source is the multi-function device 10, the router 7 transmits the information transmitted by the device set on the Internet (6) side, to the multi-function device 10, whereas in a case that the received information is not response information to information whose transmission destination is the multi-function device 10, the router 7 does not transmit the information transmitted by the device set on the Internet (6) side, to the multi-function device 10. This is the function of the firewall of the router 7. As described above, in a case that the router 7 receives information from an apparatus set on the Internet (6) side, in a case that the received information is response information to information whose transmission source is the multi-function device 10, the router 7 uses the private IP address of the multi-function device 10 to transmit the information transmitted by the device set on the Internet (6) side. This is the function of the NAT of the router 7. As described above, a service in which the multi-function device 10 can receive by transmitting information which is for requesting the service and designates the service server 110 as a transmission destination is the pull service of the communication system 2.

As described above, the router 7 stores a variety of information such as information representing that the router 7 has transmitted the HTTP request information designating the service server 110 as a transmission destination, and the private IP address of the multi-function device 10, whereby it is possible to transmit response information transmitted by the service server 110 to the multi-function device 10 through the router 7. That is, the router 7 stores a variety of information such as information for identifying the HTTP request information transmitted by the router 7 and designating the service server 110 as a transmission destination, and the private IP address of the multi-function device 10, and the service server 110 receives and stores a variety of information such as the information for identifying the HTTP request information having been transmitted by the router 7, whereby it is possible to establish a connection between the multi-function device 10 and the service server 110 and to use the established connection to transmit the response information transmitted by the service server 110, to the multi-function device 10.

Incidentally, a connection using HTTP may be referred to as an HTTP connection. Since HTTP is a protocol based on TCP, an HTTP connection may also be referred to as a TCP connection. Incidentally, in order to use the pull service, the multi-function device 10 has the protocol stack 26 to perform communication according to HTTP.

The push service is a service of a form in which when a timing to provide the service comes in the server "B" for providing the service, information relating to providing of the service is transmitted from the server "B" to the device "A" to use the service, whereby the device "A" uses the service which the server "B" provides. An example of the push service is a maintenance and inspection service in which the server "B" requests status information from the device "A", and the status information transmitted as a response from the device "A" is managed by the server "B", and maintenance and inspection according to the status information is performed. Another example of the push service is a remote setting service in which the server "B" transmits set information to the device "A", thereby performing a variety of setting on the device "A". In the communication system 2, the multi-function device 10 corresponds to the device "A" which uses the push service. The service server 100 corresponds to the server "B" which provides the push service. In a case of the push service, even if the service server 100 transmits HTTP request information which includes information relating to provision of the service and designates the multi-function device 10 as a transmission destination, as described above, the router 7 receives the HTTP request information but does not transmit the HTTP request information to the multi-function device 10. That is, using the push service in the multi-function device 10 is restricted by the function of the firewall of the router 7.

Incidentally, since a timing for the service server 100 to provide a service is unable to be seen from the multi-function device 10, it is impossible to establish a connection between the multi-function device 10 and the service server 100 by transmitting HTTP request information from the multi-function device 10, and use the established connection to receive information relating to provision of the service.

Incidentally, the pull service, the push service, and the function of a router have been described taking the multi-function device 10 and the router 7 for example; however, they are the same with respect to the multi-function device 11 and the router 8. Further, the push service has been described taking the service server 100 for example; however, it is the same even with respect to the service server 120.

<Configuration of Service Server>

The service server 100 is a server which is used for an online service. Examples of the online service include the maintenance and inspection service for the multi-function devices 10 and 11, and the remote setting service on the multi-function devices 10 and 11. The service server 100 accesses the multi-function devices 10 and 11 through the Internet 6, and performs a process of receiving a variety of information such as a residual amount of toner from the multi-function devices 10 and 11, or a process of rewriting options of the multi-function devices 10 and 11.

The service server 100 has a control unit 102. The control unit 102 includes a CPU 103 and a memory 104. The memory 104 has a data memory area 105. The data memory area 105 is an area in which a variety of data is stored. Incidentally, the configurations of the service servers 110 and 120 are basically the same as that of the service server 100, and thus will not be described.

<Operation of Multi-Function Device>

Figure 2:
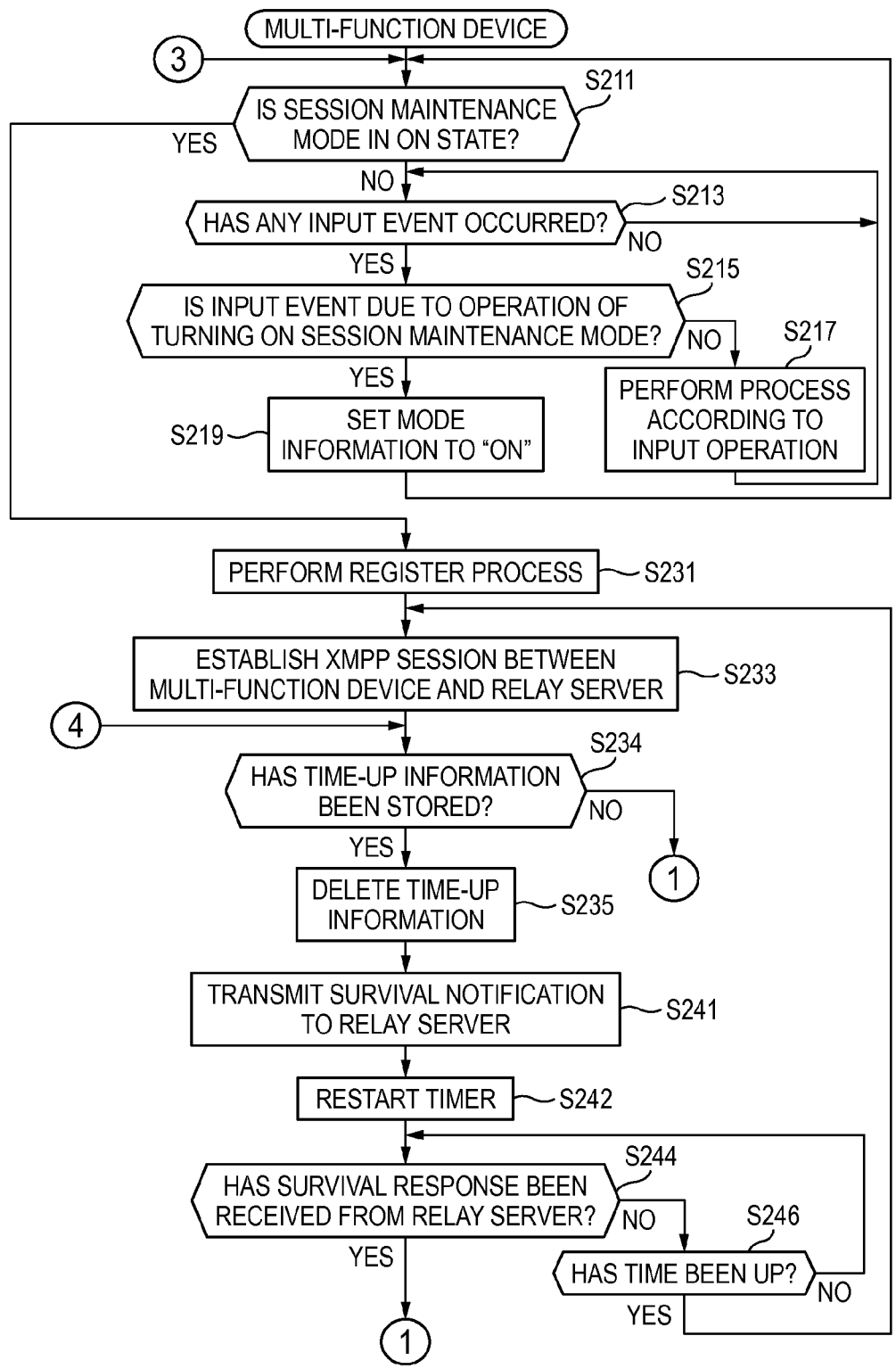
FIG. 2 shows the flow chart of processes performed by a multi-function device.
Figure 3:
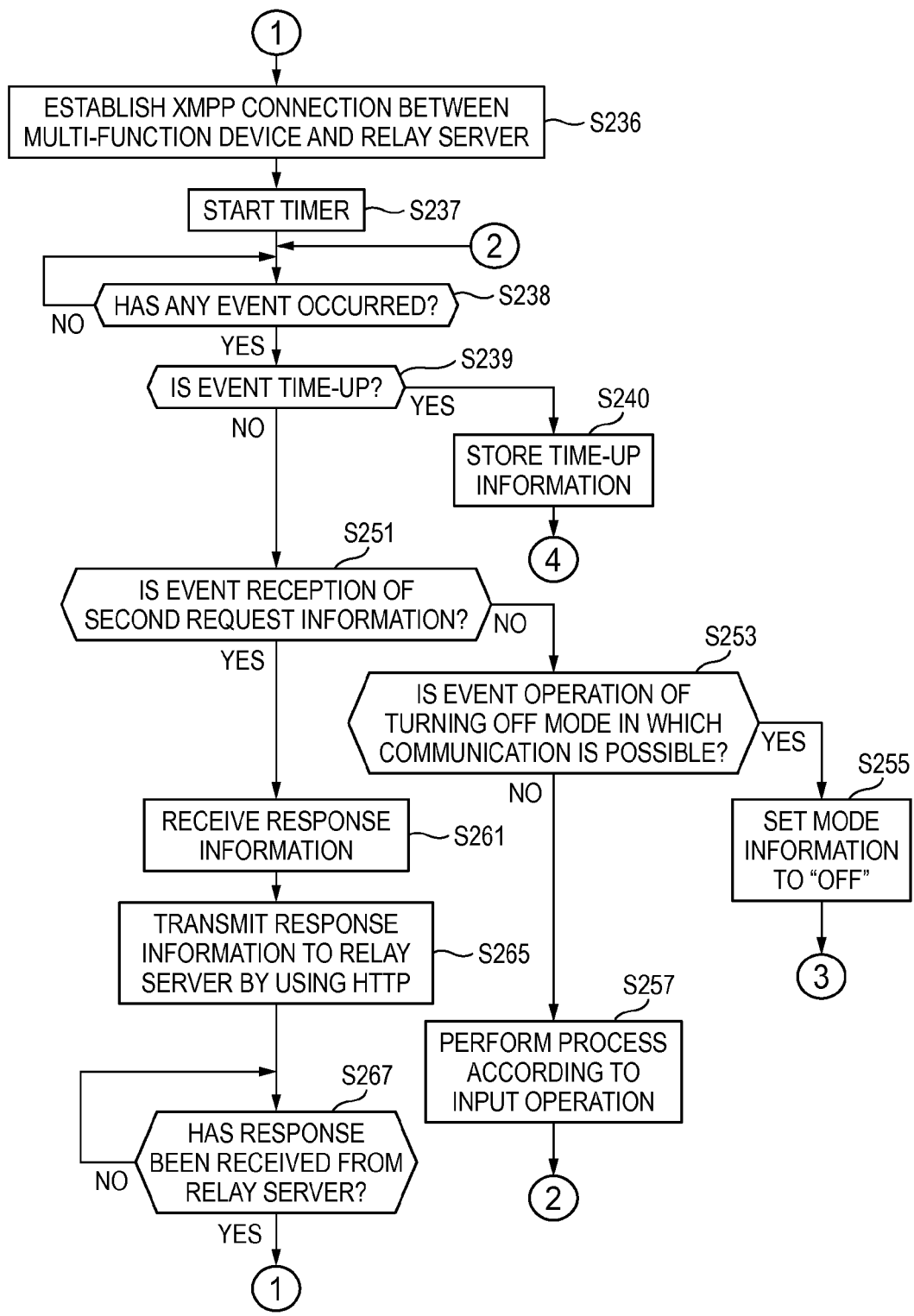
FIG. 3 shows the flow chart of processes performed by the multi-function device.

With reference to the flows of FIGS. 2 and 3, an application process which is performed on the basis of the application program 25 by the multi-function device 10 will be described. Incidentally, a process which is performed by the multi-function device 11 is the same as the process which is performed by the multi-function device 10, and thus will not be described. The flows of FIGS. 2 and 3 may be started, for example, when the power supply of the multi-function device 10 is turned on.

In STEP S211, the CPU 22 determines whether the session maintenance mode is in the ON state. STEP S211 may be performed at the time of activating the multi-function device 10. Examples of the time of activating include a case that the power supply of the multi-function device 10 has been turned on, and a case that a user's operation to instruct activation has been received after the power supply has been turned on. The corresponding determination may be performed on the basis of mode information stored in the memory 24. In a case that the session maintenance mode is not in the ON state ("NO" in STEP S211), the CPU 22 proceeds to STEP S213.

In STEP S213, the CPU 22 determines whether any input event has occurred. Whether any input event has occurred may be determined on the basis of event information which an operating system (not shown) outputs, for example, in response to a user's input to the operation unit 12. In a case that any input event has not occurred ("NO" in STEP S213), the CPU 22 returns to STEP S213. Meanwhile, in a case that an input event has occurred ("YES" in STEP S213), the CPU 22 proceeds to STEP S215. In STEP S215, the CPU 22 determines whether the input event has occurred due to an operation of turning on the session maintenance mode. In a case that the determination result is negative ("NO" in STEP S215), the CPU 22 proceeds to STEP S217 in which the CPU 22 performs a process according to the input operation, and then returns to STEP S213. Meanwhile, in a case that the determination result is positive ("YES" in STEP S215), the CPU 22 proceeds to STEP S219 in which the CPU 22 sets the mode information stored in the memory 24, to "ON", and then returns to STEP S211.

In a case that the occurred input event is due to an operation of instructing using the pull service, in STEP S217, the CPU 22 transmits HTTP request information, which includes request information for requesting using the pull service and designates the service server 110 as a transmission destination, through the protocol process. Thereafter, in a case that the service server 110 transmits HTTP response information including response information relating to using the pull service, and the network interface 16 receives the HTTP response information, the CPU 22 receives the response information relating to using the pull service, and performs a process relating to using the pull service. A process of making the multi-function device 10 form an image based on content data included in the HTTP response information, a process of making the memory 24 store the content data included in the HTTP request information, and the like are examples of a process relating to using a download service of a pull service system. A process of receiving response information representing that the content data included in the HTTP response information has been stored in the service server 110 or that the content data has been transmitted from the service server 110 to another apparatus, and notifying a service performance situation to a user is an example of a process relating to using an upload service of a pull service system.

Meanwhile, in a case that it is determined in STEP S211 that the session maintenance mode is in the ON state ("YES" in STEP S211), the CPU 22 proceeds to STEP S231. In STEP S231, the CPU 22 performs a register process. The register process is a process of registering register information of the multi-function device 10 in the device database 76 of the relay server 60. The register information includes a variety of information such as a device ID and capability information. The device ID is information for identifying the multi-function device 10. A device ID is used to identify a multi-function device which is the transmission destination of request information (to be described below). As an example of the device ID, a serial number during manufacturing of the multi-function device 10 can be taken. The capability information is information representing a variety of capability of the multi-function device 10 such as a memory capacity and paper sizes capable of printing. The register process may be performed by communication based on HTTP.

In STEP S233, the CPU 22 transmits, for example, the IP address of the relay server 60 to the protocol stack 26, on the basis of session maintenance information stored in the memory 24, thereby making the protocol stack 26 perform a protocol process for establishing an XMPP session according to XMPP over BOSH, which is a session establishment type protocol, between the multi-function device 10 and the relay server 60. Incidentally, in a case that there is an XMPP session established between the multi-function device 10 and the relay server 60, a new XMPP session may be established between the multi-function device 10 and the relay server 60. This is similar in the reverse case.

A specific procedure for establishing the XMPP session will be described. According to XMPP over BOSH, the multi-function device 10 transmits HTTP request information including first request information for requesting the relay server 60 to transmit a session ID to be used in an XMPP session. The HTTP request information including the first request information is also referred to as the XMPP session establishment request information.

In response to receiving the XMPP session establishment request information transmitted by the multi-function device 10, the relay server 60 generates a session ID, and transmits HTTP response information including the session ID, as a response, according to XMPP over BOSH.

In response to receiving the HTTP response information transmitted by the relay server 60 and receiving the session ID included in the HTTP response information, according to XMPP over BOSH, the multi-function device 10 transmits HTTP request information including the received session ID and notification information for notifying the relay server 60 that the session ID has been received.

In response to receiving the HTTP request information transmitted by the multi-function device 10 and including the session ID and the notification information, according to XMPP over BOSH, the relay server 60 replies with HTTP response information including response information representing "OK". As described above, the multi-function device 10 and the relay server 60 receive a common session ID through communication of a variety of information according to XMPP over BOSH, thereby establishing an XMPP session. Thereafter, according to XMPP over BOSH, HTTP request information including that session ID and a variety of information is transmitted, whereby transmission of information using the established XMPP session is performed. On the side having received information using the established XMPP session, it is possible to recognize that the received information is information having been transmitted by using the established XMPP session, on the basis of the session ID.

Event information representing that the XMPP session has been established is transmitted by an XMPP over BOSH process, and information identifying the established session is transmitted to the application process. Therefore, in the application process, the CPU 22 can recognize the establishment of the XMPP session. Upon recognizing the establishment of the XMPP session, the CPU 22 proceeds to STEP S234.

In STEP S234, the CPU 22 determines whether time-up information (to be described below) has been stored in the memory 24. In a case that the determination result of STEP S234 is negative ("NO" in STEP S234), the CPU 22 proceeds to STEP S236. In STEP S236, the CPU 22 controls the protocol stack 26 such that the protocol stack 26 performs a protocol process for establishing an XMPP connection, which is a connection according to XMPP over BOSH, between the multi-function device 10 and the relay server 60 by using the established session.

A specific procedure for establishing the XMPP connection will be described. According to XMPP over BOSH, the multi-function device 10 designates the relay server 60 as a transmission destination and transmits HTTP request information including: a session ID identifying a session established between the multi-function device 10 and the relay server 60; and second request information for requesting establishment of an XMPP connection. The second request information is information necessary for transmitting HTTP response information, which includes information relating to provision of the push service according to XMPP over BOSH and which will be transmitted from the relay server 60, to the multi-function device 10. The HTTP response information including the second request information is also referred to as the XMPP connection establishment request information. The router 7 transmits the XMPP connection establishment request information to the Internet 6, and the relay server 60 receives the transmitted HTTP request information, whereby an HTTP connection is established between the multi-function device 10 and the relay server 60 by the mechanism described above in the description of the pull service. The HTTP connection established by the procedure according to XMPP over BOSH as described above is an XMPP connection. Incidentally, examples of the information relating to provision of the pull service include GET request information and SET request information which the service server 100 has transmitted to the relay server. The GET request information is command information which is used for the service server 100 to request the multi-function device 10 to reply with information designated by an object ID. The SET request information is command information which is used to request the multi-function device 10 to change setting according to information designated by the object ID. Examples of the information which is designated by the object ID include information representing an MAC address, information representing an IP address, a variety of information (for example, information on the residual amount of toner) representing the state of the multi-function device 10, and so on.

In a case that the XMPP connection has been established, if it is a timing for the service server 100 to provide the push service, the relay server 60 includes SET request information, or GET request information, or the like in HTTP response information relative to the XMPP connection establishment request information, and designates the multi-function device 10 as a transmission destination, and transmits the HTTP response information. The HTTP response information relative to the XMPP connection establishment request information is also referred to as XMPP response information.

Meanwhile, in the case that the XMPP connection has been established, if it is not a timing for the service server 100 to provide push service, after it becomes a timing to provide the push service, the relay server 60 makes an XMPP response information include SET request information, or GET request information, or the like, and designates the multi-function device 10 as a transmission destination, and transmits the HTTP response information. It is not necessarily needed to transmit response information at a timing when the request information from the multi-function device 10 is received, as described above, and transmission of XMPP response information, with the multi-function device 10 designated as a transmission destination, directly in response to the provision timing of the push service of the service server side is also referred to as server-push.

The XMPP response information which the relay server 60 transmits does not include any session ID. However, since the XMPP response information does not include information capable of identifying that the XMPP response information is an HTTP response information relative to the XMPP connection establishment request information, the multi-function device 10 receiving the XMPP response information can recognize that the XMPP request information is information transmitted as a response by using the XMPP session.

Incidentally, as can be seen from that establishment of an XMPP session, establishment of an XMPP connection, transmission of XMPP request information, and transmission of XMPP response information are performed according to HTTP, XMPP over BOSH is a high-level protocol which uses HTTP, and HTTP is a low-level protocol which is used in XMPP over BOSH. A low-level protocol process transmits information received via the network interface 16 to a high-level protocol process, and the high-level protocol process processes the transmitted information. The high-level protocol process transmits information desired to be transmitted via the network interface 16, to the low-level protocol process, and the low-level protocol process processes the transmitted information. That is, the multi-function device 10 uses the protocol stack of HTTP for both of using the pull service and using the push service.

In STEP S237, the CPU 22 starts a timer (not shown). The time-up time of the timer may be determined in advance. The time-up time may be set to, for example, 1 minute.

In STEP S238, the CPU 22 determines whether any event has occurred. In a case that any event has not occurred ("NO" in STEP S238), the CPU 22 returns to STEP S238; whereas in a case that an event has occurred ("YES" in STEP S238), the CPU 22 proceeds to STEP S239. In STEP S239, the CPU 22 determines whether the event detected in STEP S238 is the time-up of the timer started in STEP S237. In a case that the event is the time-up of the timer ("YES" in STEP S239), the CPU 22 proceeds to STEP S240 in which the CPU 22 performs control such that the memory 24 stores time-up information, and returns to STEP S234.

Meanwhile, in a case that the determination result of STEP S234 is positive ("YES" in STEP S234), the CPU 22 proceeds to STEP S235. In STEP S235, the CPU 22 deletes the time-up information stored in the memory 24. Then, the CPU 22 proceeds to STEP S241.

In STEP S241, the CPU 22 transmits survival notification information designating the relay server 60 as a transmission destination, through the protocol process, by using HTTP. The survival notification information includes information for representing that the multi-function device 10 has recognized that the XMPP session has established in STEP S233. Incidentally, in the protocol process of the relay server 60, in a case that the relay server 60 is unable to recognize that the XMPP session established in STEP S233 is valid, information using the XMPP session is not transmitted to the application process of the relay server 60. However, since the CPU 22 transmits the survival notification information by using HTTP in STEP S241, even in the case that the relay server 60 is unable to recognize that the XMPP session established in STEP S233 is valid in the protocol process of the relay server 60, the survival notification information is transmitted to the application process of the relay server 60. Thereafter, the CPU 22 restarts the timer in STEP S242, and proceeds to STEP S244.

In STEP S244, the CPU 22 determines whether survival response information which the relay server 60 has transmitted in response to the survival notification information by using HTTP has been received through the protocol process. The survival response information includes information for representing that the relay server 60 has recognized that the XMPP session has been established in STEP S233. In a case that the determination result is positive ("YES" in STEP S244), the CPU 22 proceeds to STEP S236 in which the CPU 22 performs establishment of a new XMPP connection between the multi-function device 10 and the relay server 60. Meanwhile, in a case that the determination result is negative ("NO" in STEP S244), the CPU 22 proceeds to STEP S246 in which the CPU 22 determines whether a predetermined time has elapsed from the transmission of the survival notification information. In a case that the determination result is negative ("NO" in STEP S246), the CPU 22 returns to the determination of STEP S244. Meanwhile, in a case that the determination result is positive ("YES" in STEP S246), the CPU 22 returns to STEP S233 in which the CPU 22 performs establishment of a new XMPP session between the multi-function device 10 and the relay server.

As described above, in a case that it is impossible to recognize reception of an XMPP response information including SET request information, or GET request information, or the like until elapse of the time-up time from the establishment of the XMPP connection, the CPU 22 transmits the survival notification information to the relay server, thereby notifying the relay server 60 that the multi-function device 10 has recognized that the XMPP session has been established. As described above, the CPU 22 receives the survival response information from the relay server 60, whereby the multi-function device (10) side recognizes that the relay server 60 has recognized that the XMPP session has been established.

Further, in a case that it is possible to recognize that the relay server 60 has recognized that the XMPP session has established, on the basis of the survival response information, since there is a possibility that the XMPP connection might be cut, the CPU 22 newly establishes an XMPP connection, thereby performing preparation to transmit XMPP response information which the relay server 60 will transmit, to the multi-function device 10. Examples of a case that the XMPP connection has been cut include a case that there has been no reply with XMPP response information for a while from the establishment of the XMPP connection, and thus a device existing between the multi-function device 10 and the relay server 60, for example, the router 7 or the like, has deleted information representing that the corresponding device had transmitted the XMPP connection establishment request information to the Internet 6, information representing the private IP address of the multi-function device 10, and the like.

In a case that it has not been impossible to receive the survival response information and recognize that the relay server 60 has recognized that the XMPP session has been established, since there is a possibility that the XMPP connection might be cut, the CPU 22 newly establishes an XMPP session and establishes an XMPP connection, thereby performing preparation to transmit XMPP response information which the relay server 60 will transmit, to the multi-function device 10. Examples of the case that the XMPP session has been cut include a case that the session ID, information identifying the established XMPP session, and the like has been deleted from the relay server 60 due to resetting of the relay server 60. Further, examples of the case that the XMPP session has been cut include a case that with respect to an XMPP session in which transmission of XMPP response information had not been performed for a long time, information identifying the corresponding XMPP session, and the like has been deleted by the protocol process of the relay server 60.

Preparation for transmitting XMPP response information which the relay server 60 will transmit, to the multi-function device 10 on the basis of transmission of survival notification information and confirmation of the survival response information as described above is performed whenever the time-up time elapses. As described above, whenever a timing for the service server 100 to provide the push service comes, the multi-function device 10 is always ready to receive XMPP response information including SET request information, or GET request information, or the like. That is, the multi-function device 10 can always use the push service.

Incidentally, in the present illustrative embodiment, there is a possibility that an XMPP connection will be cut after establishment of the XMPP connection until elapse of the time-up time. That is, the term "always" described in the description of the present illustrative embodiment means that if it is possible to use the push service almost always, a short period of time when it is impossible to use the push service is allowable.

Incidentally, if the time-up time is set to a time for which a device positioned between the multi-function device 10 and the relay server 60 does not cut an XMPP connection even though there is no reply with XMPP response information for a while from establishment of the XMPP connection, it is convenient. For example, the time-up time may be set to 1 minute. Needless to say, the time-up time may also be set to a time longer than 1 minute. Further, in a case that the device positioned between the multi-function device 10 and the relay server 60 rarely cuts the XMPP connection, the time-up time may be set to be very long. For example, the time-up time may be set to 24 hours. Further, the processes subsequent to transmission of the survival notification information and using the time-up time may not be performed at all.

Further, in a case that it is determined in STEP S239 that the event is not the time-up of the timer ("NO" in STEP S239), the CPU 22 proceeds to STEP S251. In STEP S251, the CPU 22 determines whether the event detected in STEP S238 is an event having occurred due to reception of the second request information by the network interface 16. The second request information is information which is transmitted from the relay server 60 to the multi-function device 10 through the XMPP session. Examples of the second request information include GET request information or SET request information transmitted to the relay server 60 by the service server 100, and designating the multi-function device 10 as the transmission destination.

In a case that the determination result of STEP S251 is positive ("YES" in STEP S251), the CPU 22 proceeds to STEP S261. In STEP S261, the CPU 22 analyzes the second request information and receives response information corresponding to the second request information. In a case that the second request information is GET request information, the CPU 22 may read a variety of information designated by an object ID and stored in the memory 24, such as information representing an MAC address, information representing an IP address, a variety of information representing the state of the multi-function device 10, and the like, through an operating system, thereby receiving response information. This is an example of the receipt of the response information. In a case that the second request information is SET request information, the CPU 22 changes some information such as set information designated by the object ID and stored in the memory 24, through the operating system, and generates information representing the changed result, thereby receiving response information. This is an example of the receipt of the response information.

Further, the CPU 22 incorporates a request ID included in the second request information, into the response information. For example, in a case that the second request information is GET request information, the CPU 22 generates GET response information including information designated by the object ID included in the GET request information. Further, for example, in a case that the second request information is SET request information, the CPU 22 generates SET response information including information representing that a setting process such as a process of changing information designated by the object ID included in the SET request information has been performed.

In STEP S265, the CPU 22 transmits HTTP request information including the response information generated in STEP S261 to the relay server 60 through the protocol process, according to HTTP which is a session-less type protocol.

In STEP S267, the CPU 22 determines whether the network interface 16 has received the HTTP response information which the relay server 60 transmitted to the multi-function device 10 in response to the HTTP request information transmitted in STEP S265. In a case that the HTTP response information has not been received ("NO" in STEP S267), the CPU 22 returns to STEP S267. Meanwhile, in a case that the HTTP response information has been received, the CPU 22 returns to STEP S236 in which the CPU 22 performs a process for newly establishing an XMPP connection between the multi-function device 10 and the relay server 60, whereby the multi-function device 10 becomes able to use the push service again.

Meanwhile, in a case that it is determined in STEP S251 that the event detected in STEP S238 is not reception of second request information ("NO" in STEP S251), the CPU 22 proceeds to STEP S253. In STEP S253, the CPU 22 determines whether the event detected in STEP S238 is an input event having occurred due to an operation of turning off the session maintenance mode. In a case that the determination result is negative ("NO" in STEP S253), the CPU 22 proceeds to STEP S257 in which the CPU 22 performs a process according to the input operation, similarly in STEP S217. Then, the CPU 22 returns to STEP S238. Meanwhile, in a case that the determination result is positive ("YES" in STEP S253), the CPU 22 proceeds to STEP S255 in which the CPU 22 sets mode information stored in the memory 24, to "OFF". Then, the CPU 22 returns to STEP S211.

<Operation of Relay Server>

Figure 4:
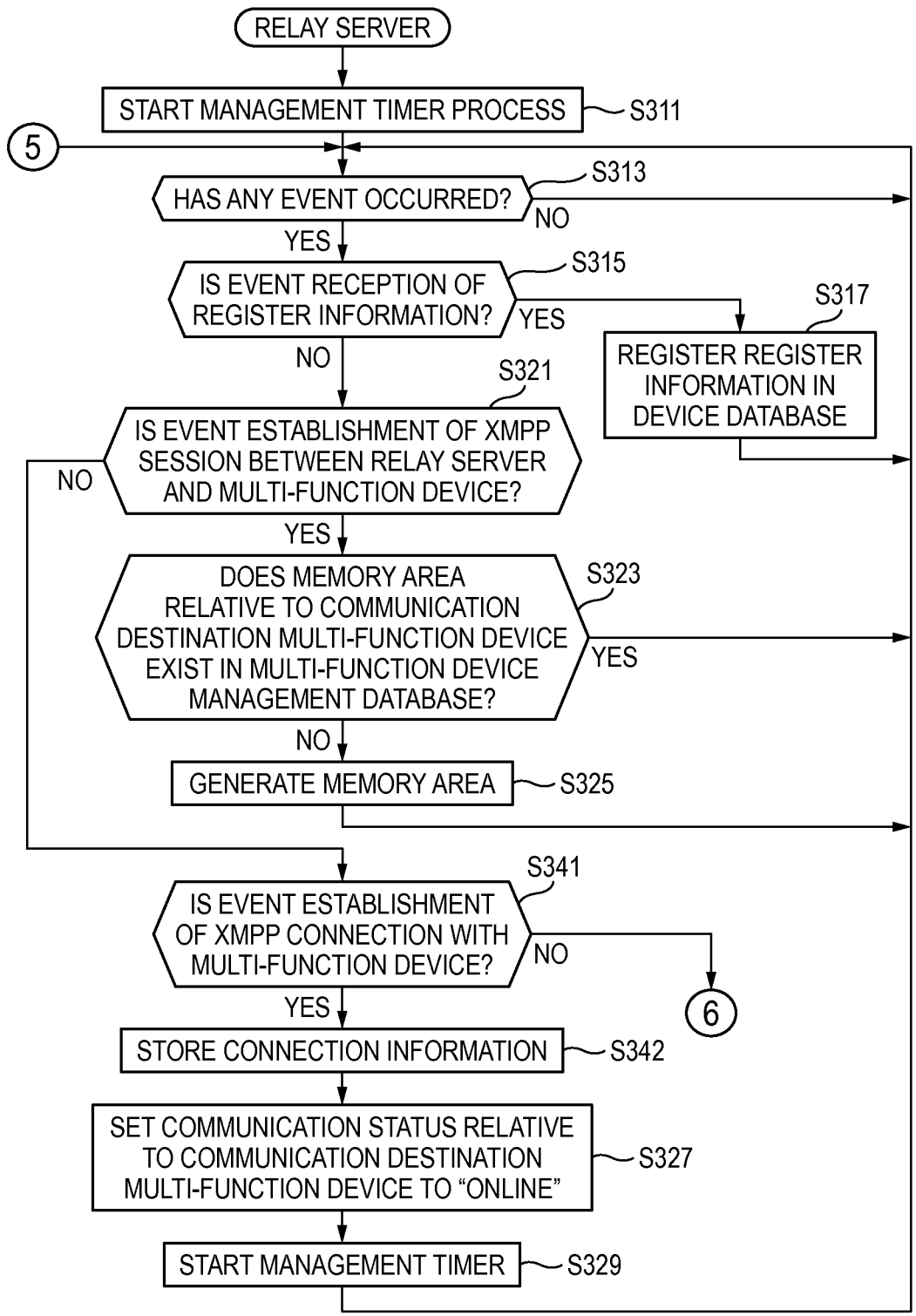
FIG. 4 shows the flow chart of processes performed by a relay server.
Figure 5B:
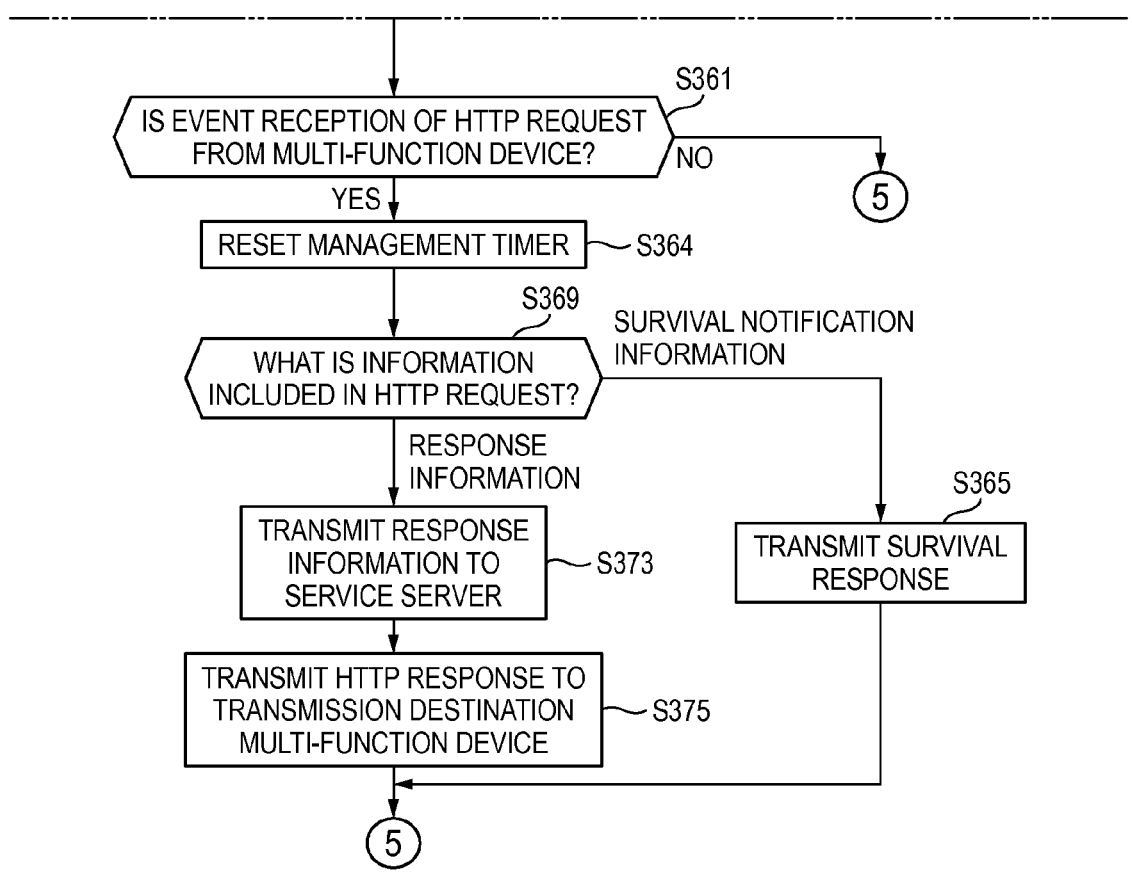

Detailed operations of the relay server 60 will be described with reference to the flows of FIGS. 4 and 5. The flow chart of FIG. 4 may be started, for example, the relay server 60 is powered up. In STEP S311, the CPU 72 starts a management timer process. The management timer process will be described below. In STEP S313, the CPU 72 determines whether any event has occurred. In a case that any even has not occurred ("NO" in STEP S313), the CPU 72 returns to STEP S313. Meanwhile, in a case that an even has occurred ("YES" in STEP S313), the CPU 72 proceeds to STEP S315. In STEP S315, the CPU 72 determines whether the occurred event is an event having occurred due to reception of register information from the multi-function device 10 or 11 by the network interface 62. In a case that the determination result is positive ("YES" in STEP S315), the CPU 72 proceeds to STEP S317 in which the CPU 72 registers the received register information in the device database 76. Thereafter, the CPU 72 returns to STEP S313.

Incidentally, the CPU 72 may authenticate the multi-function device 10 or 11 by using authentication information such as a PIN code on the occasion of reception of the register information. In this case, in a case that the multi-function device 10 or 11 is authenticated as an apparatus whose register information needs to be registered, the CPU 72 may register the register information in the device database 76.

Meanwhile, in a case that the determination result of STEP S315 is negative ("NO" in STEP S315), the CPU 72 proceeds to STEP S321. In STEP S321, the CPU 72 determines whether the occurred event is an event having occurred due to establishment of an XMPP session between the relay server 60 and the multi-function device 10 or 11 according to the protocol process. In the protocol process, establishment of the XMPP session is performed by the procedure described previously in the part having the title "OPERATION OF MULTI-FUNCTION DEVICE 10". In a case that the determination result is positive ("YES" in STEP S321), the CPU 72 proceeds to STEP S323.

In STEP S323, the CPU 72 determines whether an area storing communication status information and a request ID relative to the multi-function device having established the XMPP session exists in the multi-function device management database 77. In a case that the corresponding area exists ("YES" in STEP S323), the CPU 72 returns to STEP S313. Meanwhile, in a case that the corresponding area does not exist ("NO" in STEP S323), the CPU 72 proceeds to STEP S325. In STEP S325, the CPU 72 generates an area storing the communication status information and the request ID relative to the multi-function device having established the XMPP session, in the multi-function device management database 77. Then, the CPU 72 returns to STEP S313.

Meanwhile, in a case that the occurred event is not an event having occurred due to establishment of an XMPP session ("NO" in STEP S321), the CPU 72 returns to STEP S341. In STEP S341, the CPU 72 determines whether the occurred event is an event having occurred due to establishment of an XMPP connection between the relay server 60 and the multi-function device having established the XMPP session, according to the protocol process. In the protocol process, establishment of an XMPP connection is performed by the procedure described previously in the part having the title "OPERATION OF MULTI-FUNCTION DEVICE 10". In a case that the determination result is positive ("YES" in STEP S341), the CPU 72 proceeds to STEP S342. In STEP S342, the CPU 72 stores connection information identifying the established XMPP connection, in the memory 74. Then, the CPU 72 proceeds to STEP S327.

In STEP S327, the CPU 72 sets the communication status information stored in the multi-function device management database 77 and relative to the multi-function device having established the XMPP connection, to "ONLINE". In STEP S329, the CPU 72 starts a management timer (not shown) relative to the multi-function device having established the XMPP connection. Thereafter, the CPU 72 returns to STEP S313. The management timer is a timer, which is provided with respect to each multi-function device having established an XMPP connection, and which is a software timer for determining whether the time-up time has elapsed from the establishment of the XMPP connection. In a case that the time-up time has elapsed from the establishment of the XMPP connection, the management timer outputs an event representing that the time is up. The time-up time is set to, for example, 2 minutes.

Meanwhile, in a case that the determination result of STEP S341 is negative ("NO" in STEP S341), the CPU 72 proceeds to STEP S331. In STEP S331, the CPU 72 determines whether the occurred event is the time-up of the management timer. In a case that the determination result is positive ("YES" in STEP S331), the CPU 72 proceeds to STEP S333 in which the CPU 72 sets communication status information stored in the multi-function device management database 77 and relative to the multi-function device corresponding to the management timer in which the time has been up, to "OFFLINE". Thereafter, the CPU 72 returns to STEP S313. Meanwhile, in a case that the determination result is negative ("NO" in STEP S331), the CPU 72 proceeds to STEP S343.

In STEP S343, the CPU 72 determines whether the occurred event is an event having occurred due to reception of HTTP request information from the service server 100 or 120 by the network interface 62. In a case that the determination result is negative ("NO" in STEP S343), the CPU 72 proceeds to STEP S361. Meanwhile, in a case that the determination result is positive ("YES" in STEP S343), the CPU 72 proceeds to STEP S345. In STEP S345, the CPU 72 receives information included in the HTTP request information, through the protocol process, and determines which information the received information is.

In a case that the HTTP request information includes device ID inquiry information ("DEVICE ID INQUIRY INFORMATION" in STEP S345), the CPU 72 proceeds to STEP S347. The device ID inquiry information is information representing that the relay server 60 is requested to reply with the device ID of the multi-function device which is to receive the push service from the service server 100 or 120. In STEP S347, the CPU 72 detects the device ID of the multi-function device corresponding to the device ID inquiry information, from the device database 76. Thereafter, through the protocol process, the CPU 72 designates the service server which is the transmission source of the device ID inquiry information, and transmits HTTP response information including the detected device ID.

Meanwhile, in a case that the HTTP request information includes first request information ("FIRST REQUEST INFORMATION" in STEP S345), the CPU 72 proceeds to STEP S349. The first request information is information which is transmitted from the service server 100 or 120. Examples of the first request information include GET request information, SET request information, and the like. The first request information includes a device ID, an object ID, and the like.

In STEP S349, the CPU 72 determines whether the multi-function device which is the transmission destination of the first request information is offline, on the basis of the communication status information stored in the multi-function device management database 77. Specifically, the CPU 72 determines whether the communication status information of the multi-function device corresponding to the device ID included in the first request information is "OFFLINE". In a case that it is determined that the communication destination multi-function device is not offline ("NO" in STEP S349), the CPU 72 proceeds to STEP S353.

In STEP S353, the CPU 72 generates a request ID. Thereafter, the CPU 72 stores the generated request ID in the memory 74 in association with the first request information received in STEP S343. For example, the request ID may be the reception time of the first request information, or may be a number generated uniquely.

In STEP S355, the CPU 72 transmits second request information to the communication destination multi-function device by using the XMPP session. Specifically, the CPU 72 transmits XMPP response information including the second request information and relative to the XMPP connection having been established between the relay server and the transmission destination multi-function device, to the transmission destination multi-function device, through the protocol process. The second request information is information obtained by adding the request ID to the first request information. The second request information needs only to include at least the request ID and the object ID, and may not include the device ID included in the first request information. Thereafter, the CPU 72 returns to STEP S313.

Meanwhile, in a case that it is determined in STEP S349 that the communication destination multi-function device is offline ("YES" in STEP S349), the CPU 72 proceeds to STEP S351. In STEP S351, the CPU 72 transmits HTTP response information including error information representing that it is impossible to transmit the first request information to the communication destination multi-function device, to the service server which is the transmission source of the first request information, through the protocol process. Thereafter, the CPU 72 returns to STEP S313.

Meanwhile, in a case that the determination result of STEP S343 is negative ("NO" in STEP S343), the CPU 72 proceeds to STEP S361. In STEP S361, the CPU 72 determines whether the occurred event is an event having occurred due to reception of HTTP request information from the multi-function device 10 or 11. Incidentally, HTTP request information to be an object of the determination is HTTP request information different from XMPP request information relative to an XMPP session having established between the service server and the multi-function device 10 or 11. In a case that the determination result of STEP S361 is negative ("NO" in STEP S361), the CPU 72 returns to STEP S313. Meanwhile, in a case that the determination result of STEP S361 is positive ("YES" in STEP S361), the CPU 72 proceeds to STEP S364. In STEP S364, the CPU 72 resets a management timer corresponding to the multi-function device which is the transmission source of the HTTP request information.

In STEP S369, the CPU 72 receives information included in the HTTP request information, through the protocol process, and determines which information the received information is. In a case that the HTTP request information includes response information ("RESPONSE INFORMATION" in STEP S369), the CPU 72 proceeds to STEP S373.

In STEP S373, the CPU 72 reads a request ID included in the response information. Subsequently, the CPU 72 detects first request information corresponding to a request ID coinciding with the request ID included in the response information, from the multi-function device management database 77. Thereafter, the CPU 72 transmits the HTTP response information including the response information, to the service server which is the transmission source of the detected first request information, through the protocol process.

In STEP S375, the CPU 72 transmits HTTP response information as a response to the HTTP request information including the response information, to the multi-function device which is the transmission source of the HTTP request information, through the protocol process. Thereafter, the CPU 72 returns to STEP S313.

Meanwhile, in a case that it is determined in STEP S369 that the HTTP request information includes survival notification information ("SURVIVAL NOTIFICATION INFORMATION" in STEP S369), the CPU 72 proceeds to STEP S365. In STEP S365, the CPU 72 replies with HTTP response information including the survival response information, to the multi-function device which is the transmission source of the HTTP request information including the survival notification information, through the protocol process. Thereafter, the CPU 72 returns to STEP S313.

<Operation of Service Server>

Figure 6:
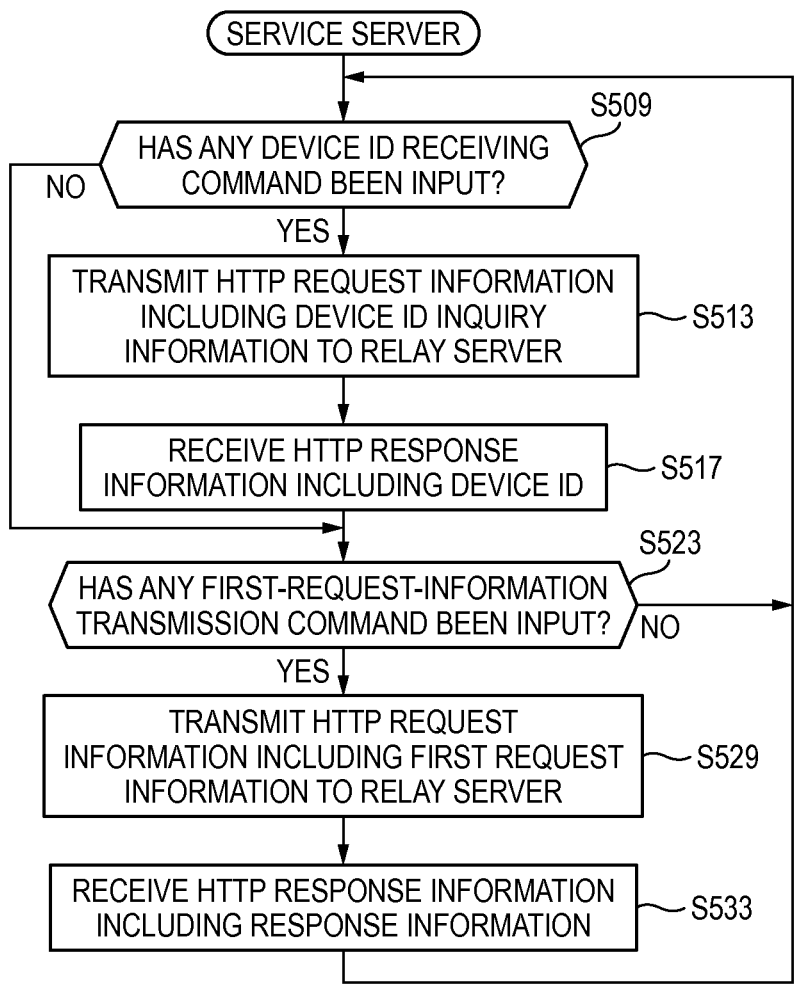
FIG. 6 shows the flow chart of processes performed by a service server.

Detailed operations of the service server 100 or 120 will be described with reference to the flow of FIG. 6. The flow of FIG. 6 may be started, for example, when the service server 100 or 120 is powered up. In STEP S509, the CPU 103 determines whether any command for receiving a device ID for identifying a multi-function device which is an object of provision of the service has been input. In a case that any device ID receiving command has not been input ("NO" in STEP S509), the CPU 103 proceeds to STEP S523. Meanwhile, in a case that a device ID receiving command has been input ("YES" in STEP S509), the CPU 103 proceeds to STEP S513. The device ID receiving command may be input by an operation on the service server 100.

In STEP S513, the CPU 103 transmits HTTP request information including device ID inquiry information, to the relay server 60. In STEP S517, the CPU 103 receives HTTP response information, which the relay server 60 has transmitted with respect to the HTTP request information transmitted in STEP S513, and includes a device ID.

In STEP S523, the CPU 103 determines whether any first-request-information transmission command has been input. A first-request-information transmission command is a command for transmitting first request information to a multi-function device identified by the device ID received in STEP S517. In a case that any first-request-information transmission command has not been input ("NO" in STEP S523), the CPU 103 returns to STEP S509. Meanwhile, in a case that a first-request-information transmission command has been input ("YES" in STEP S523), the CPU 103 proceeds to STEP S529. The first-request-information transmission command may also be input by an operation on the service server 100.

In STEP S529, the CPU 103 transmits HTTP request information including first request information, to the relay server 60. The first request information includes the device ID received in STEP S517. In STEP S533, the CPU 103 receives HTTP response information, which the relay server 60 has transmitted in response to the HTTP request information transmitted in STEP S529, and includes response information. Thereafter, the CPU 103 returns to STEP S509.

<First Operation Example of Communication System>

Figure 7:
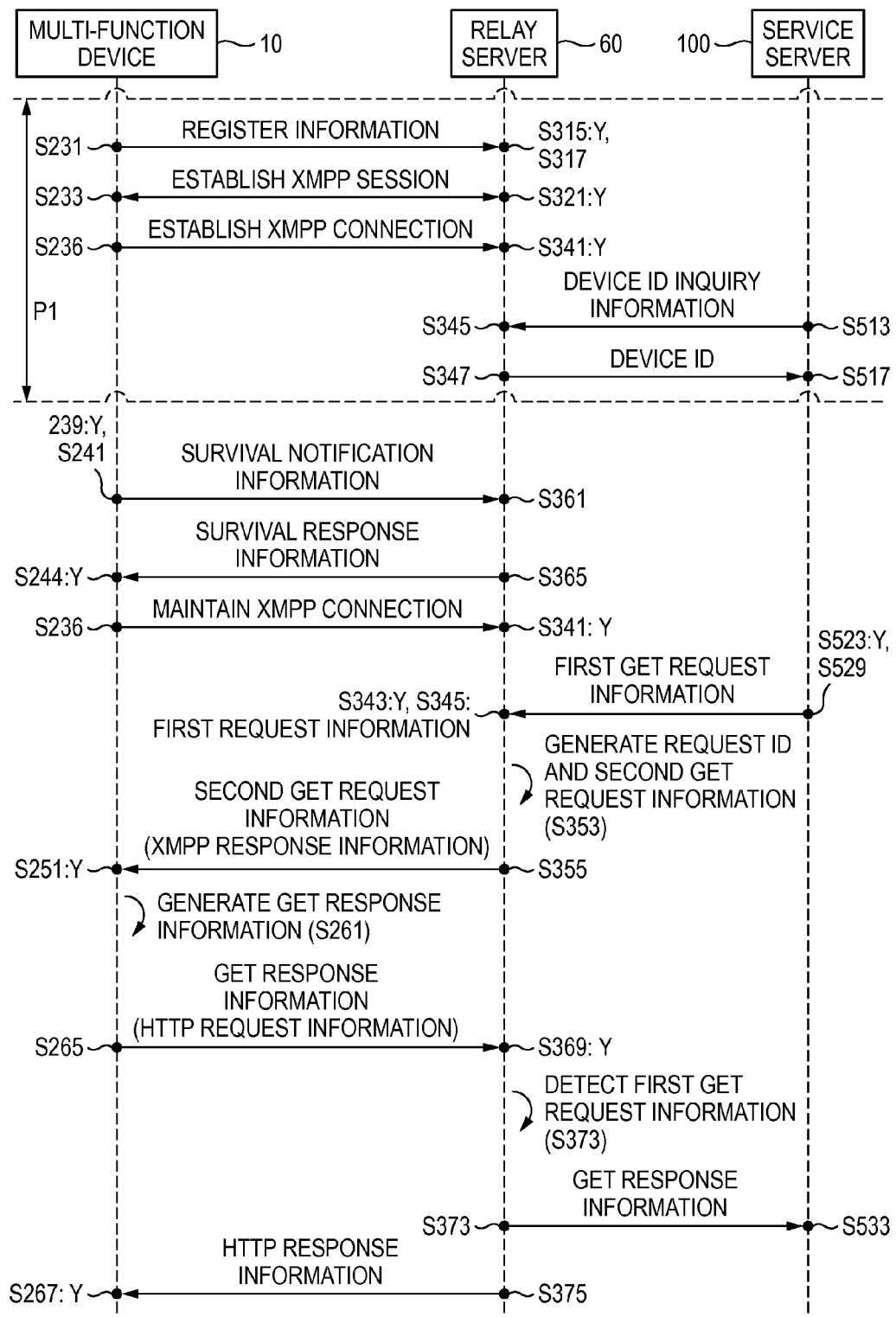
FIG. 7 is a flow chart illustrating a first operation example of a communication system.

A first operation example of the communication system 2 will be described with reference to the sequence diagram of FIG. 7. With reference to FIG. 7, a case that GET request information is transmitted from the service server 100 to the multi-function device 10 through the relay server 60 while the XMPP session between the multi-function device 10 and the relay server 60 is maintained will be described. Also, a case that the session maintenance mode of the multi-function device 10 has been set to "ON" will be described.

Upon the multi-function device 10 is powered up, since the session maintenance mode has been set to "ON" ("YES" in STEP S211), in STEP S231, the multi-function device 10 transmits register information to the relay server 60. In response to receiving the register information ("YES" in STEP S315), the relay server 60 registers the received register information in the device database 76 in STEP S317. In a case that the multi-function device 10 transmits XMPP session establishment request information, the multi-function device 10 and the relay server 60 establishes an XMPP session in STEP S233 ("YES" in STEP S321). Since the multi-function device 10 transmits XMPP connection establishment request information, an XMPP connection is established between the multi-function device 10 and the relay server 60 in STEP S236 ("YES" in STEP S341).

In order to start a process of providing the service to the multi-function device 10, a command for receiving a device ID identifying the multi-function device 10 is input to the service server 100 ("YES" in STEP S509). The service server 100 transmits device ID inquiry information for requesting the device ID of the multi-function device 10, to the relay server 60 in STEP S513. In response to receiving the device ID inquiry information ("DEVICE ID INQUIRY INFORMATION" in STEP S345), the relay server 60 searches for the device ID of the multi-function device 10 and transmits the searched device ID to the service server 100 in STEP S347.

In a case that the time of the timer is up ("YES" in STEP S239), the multi-function device 10 transmits survival notification information to the relay server 60 in STEP S241. In response to receiving the survival notification information ("SURVIVAL NOTIFICATION INFORMATION" in STEP S361), the relay server 60 replies with survival response information in STEP S365. In response to receiving the survival response information ("YES" in STEP S244), the multi-function device 10 transmits XMPP connection establishment request information in STEP S236, whereby the XMPP connection relative to the XMPP session established between the multi-function device 10 and the relay server 60 is maintained in STEP S236 ("YES" in STEP S341).

Meanwhile, in a case that the multi-function device 10 does not receive any survival response information ("NO" in STEP S235), the multi-function device 10 transmits XMPP session establishment request information in STEP S233. Therefore, the XMPP session between the multi-function device 10 and the relay server 60 is maintained ("YES" in STEP S321). Incidentally, there may be a case that the multi-function device 10 transmits XMPP connection establishment request information after the XMPP connection established by the multi-function device 10 and the relay server 60 is invalidated. Also, there may be a case that the multi-function device 10 transmits XMPP session establishment request information after the XMPP session established by the multi-function device 10 and the relay server 60 is invalidated. That is, the term "maintenance" described in the description of the present illustrative embodiment means that there is almost always a connection and a session established almost always and a short period of time when there is no connection and no session established is allowable.

In a case that a transmission command of first GET request information which is request information for receiving information from the multi-function device 10 is input to the service server 100 ("YES" in STEP S523), the service server 100 transmits the first GET request information to the relay server 60 in STEP S529. At this time, the final transmission destination of the first GET request information becomes the multi-function device 10. In response to receiving the first GET request information ("YES" in STEP S343, and "FIRST REQUEST INFORMATION" in STEP S345), the relay server 60 determines that the multi-function device 10 which is the transmission destination of the first GET request information is not offline ("NO" in STEP S349), and generates a request ID in STEP S353. Further, the relay server 60 stores the request ID in the multi-function device management database 77 in association with the first GET request information in STEP S353.

The relay server 60 adds the generated request ID to the first GET request information, thereby generating second GET request information. Thereafter, in STEP S355, the relay server 60 transmits the generated second GET request information to the multi-function device 10 by using the XMPP session. Specifically, the relay server 60 transmits XMPP response information including the generated second GET request information and relative to the XMPP connection established between the relay server 60 and the multi-function device 10, to the multi-function device 10.

In a case that the multi-function device 10 receives the second GET request information ("YES" in STEP S251), in STEP S261, the multi-function device 10 analyzes the second GET request information, and performs a process based on information received by the analysis, thereby receiving GET response information. For example, in a case that the second request information is information for requesting receipt of apparatus information, the multi-function device 10 receives GET response information including the device information of the multi-function device 10. At this time, to the GET response information, the request ID included in the second GET request information is added. The multi-function device 10 transmits HTTP request information including the GET response information, to the relay server 60 in STEP S265.

In response to receiving the HTTP request information including the GET response information ("YES" in STEP S369), the relay server 60 reads the request ID included in the GET response information. The relay server 60 detects first GET request information linked to a request ID coinciding with the request ID included in the GET response information, from the multi-function device management database 77 in STEP S373. Thereafter, the relay server 60 transmits the GET response information received from the multi-function device 10, as GET response information relative to the detected first GET request information, to the service server 100 in STEP S373.

Further, in response to receiving the GET response information (STEP S369), the relay server 60 replies with HTTP response information to the multi-function device 10 in STEP S375. In response to receiving the HTTP response information, the multi-function device 10 performs a process for newly establishing an XMPP connection between the multi-function device 10 and the relay server 60, and thus the multi-function device 10 becomes able to use the push service again.

<Second Operation Example of Communication System>

A second operation example of the communication system 2 will be described with reference to the sequence diagram of FIG. 8. With reference to FIG. 8, a case that GET request information is not transmitted from the service server 100 to the multi-function device 10 through the relay server 60 while the XMPP session between the multi-function device 10 and the relay server 60 is not maintained will be described.

Operations in a period P1 of FIG. 8 are the same as the operations in a period P1 of FIG. 7, and thus will not be described. In a case that the multi-function device 10 is powered off, the session ID identifying the session established between the multi-function device 10 and the relay server 60 is not retained in the multi-function device 10, and thus the session is considered as having been cut. In this case, since any survival notification is not transmitted from the multi-function device 10, in the relay server 60, in the management timer corresponding to the multi-function device 10, time-up occurs ("YES" in STEP S331). Therefore, in STEP S333, the relay server 60 sets the communication status information of the multi-function device 10 corresponding to the management timer in which the time-up has occurred, to "OFFLINE".

Even though the relay server 60 has received the first GET request information ("YES" in STEP S343, and "FIRST REQUEST INFORMATION" in STEP S345), it is determined that the multi-function device 10 which is the transmission destination of the first GET request information is offline ("YES" in STEP S349). Therefore, in STEP S351, the relay server 60 transmits error information to the service server 100.

<Advantages>

The router 7 is provided between the multi-function device 10 and the Internet 6. The router 7 may have a firewall function. In a case that information which the router 7 has received from an apparatus located on the Internet (6) side is response information to information whose transmission source is the multi-function device 10, the firewall function performs a process of transmitting the information transmitted by the device located on the Internet (6) side to the multi-function device 10. On the other hand, in a case that information which the router 7 has received from an apparatus located on the Internet (6) side is not response information to information whose transmission source is the multi-function device 10, the firewall function performs a process of preventing the information transmitted by the device located on the Internet (6) side from being transmitted to the multi-function device 10. In this case, in order to perform the above described push service, request information may be transmitted from the service server to the multi-function device 10 through the Internet 6. In this case, since it is necessary for the service server to perform a process for exceeding the firewall function or the like, the processing load of the service server becomes large. According to the technology disclosed in this specification, it is possible to transmit request information from the service server to the multi-function device 10 through the relay server 60. Therefore, in STEP S355, request information is transmitted from the relay server 60 to the multi-function device 10 by using the session established according to XMPP over BOSH of a session establishment type. Since the session established according to XMPP over BOSH is used, so-called server-push in which request information is transmitted from the Internet (6) side to the multi-function device 10 becomes possible. Therefore, even in a case that the router 7 has the firewall function or the address converting function, the service server needs not to perform a process for exceeding the firewall function or the address converting function, and it becomes possible to transmit request information from the service server to the multi-function device 10. Therefore, it is possible to reduce the processing load of the service server.

According to the technology disclosed in this specification, even if a predetermined time elapses after server-push becomes possible between the multi-function device 10 and the relay server 60, the state in which the server-push from the relay server 60 is possible is maintained. As a result, it becomes possible to always provide the push service by using the session establishment type protocol. Therefore, it becomes possible to immediately transmit request information transmitted from the service server to the relay server 60, from the relay server 60 to the multi-function device 10. Therefore, it becomes possible to improve a communication response speed between the service server and the multi-function device 10, and to improve the real-time property of communication.

A process of establishing a connection according to XMPP over BOSH may be more complicated and take a larger amount of processing time, as compared to a process of establishing a connection according to HTTP. For example, in some cases such as a case that an XMPP processing unit 63 for establishing a connection according to XMPP over BOSH is provided in an external server separate from the relay server 60, in order to establish a connection according to XMPP over BOSH, it is necessary for request information to pass through the external server, and thus the process becomes complicated. According to the technology disclosed in this specification, in STEP S265, it is possible to transmit response information relative to request information transmitted from the relay server 60 to the multi-function device 10, as a request of HTTP, from the multi-function device 10 to the relay server 60 by using a second connection according to the session-less type HTTP. Therefore, as compared to a case of transmitting response information by using a session established according to the session establishment type XMPP over BOSH, it becomes possible to transmit response information to the relay server 60 more quickly by a simpler process.

According to the technology disclosed in this specification, in response to receiving request information from the service server ("YES" in STEP S343), the relay server 60 generates a request ID in STEP S353, and stores the generated request ID in the memory 74 in association with the received request information in STEP S353. Subsequently, in STEP S355, the relay server 60 transmits request information including the request ID, to the multi-function device 10. Thereafter, in response to receiving response information relative to the request information, from the multi-function device 10 ("YES" in STEP S369), the relay server 60 reads the request ID included in the response information in STEP S373, and detects request information linked to the read request ID, from the multi-function device management database 77, in STEP S373. Therefore, it is possible to provide a push service associated with response information correctly corresponding to request information, without a load to establish a session to enable server-push directly between the service server and the multi-function device. Further, even in a case that there is a plurality of service servers, or a case that there is a plurality of multi-function devices, it is possible to make it unnecessary to establish sessions to enable server-push directly between the plurality of service servers and the plurality of multi-function devices.

According to the technology disclosed in this specification, in response to receiving the response information as an HTTP request from the multi-function device 10 ("YES" in STEP S369), the relay server 60 replies with the HTTP response to the multi-function device 10 in STEP S375. Therefore, it is possible to prevent occurrence of situations attributable to abnormal finish of a connection such as: a situation in which the multi-function device 10 having transmitted the response information waits for response data to be transmitted as a response until a time-out occurs; a situation in which the multi-function device 10 having transmitted the response information determines that a time-out has occurred and repeats transmission of the response information, or the like. Therefore, it is possible to reduce the loads of the multi-function device 10, the relay server 60, and the LAN 4.

According to the technology disclosed in this specification, in a case that the session between the multi-function device 10 and the relay server 60 has been cut, and thus it is impossible to transmit request information to the multi-function device 10 ("YES" in STEP S349), the relay server 60 can output error information, as an HTTP response relative to the request information, to the service server in STEP S351. Therefore, it is possible to prevent occurrence of a situation attributable to abnormal finish of a connection and to be loads on the multi-function device 10, the relay server 60, and the Internet 6.

According to the technology disclosed in this specification, it is possible to set whether to establish a session according to mode information stored in the memory 24, in STEP S211. Even though the session between the multi-function device 10 and the relay server 60 has been cut, so long as the multi-function device 10 is in the session maintenance mode, establishment request information can be transmitted from the multi-function device 10, whereby it is possible to establish the session again. Therefore, it becomes possible to always provide the push service by using the session establishment type protocol.

According to the technology disclosed in this specification, the mode information representing that the multi-function device 10 is in the session maintenance mode is stored in the memory 24 during manufacturing of the multi-function device 10. As a result, when the multi-function device 10 is activated, it is possible to establish a session. Therefore, the manufacture side or sales side of the multi-function devices 10, such as a vendor or a dealer can determine a multi-function device 10 desired to always receive the push service, and enables the determined multi-function device 10 to use the push service.

According to the technology disclosed in this specification, it is possible to establish a session of XMPP over BOSH which is a higher-level protocol than HTTP, by using HTTP which is used to use the pull service. Therefore, it becomes possible to always provide the push service, without a necessity for the multi-function device 10 and the relay server 60 to cope with a new protocol only for establishing a session.

According to the technology disclosed in this specification, it is possible to establish a session for enabling server-push of XMPP over BOSH, by using HTTP which is used to use the pull service. Therefore, it is possible to provide a push service corresponding to response information, by using a configuration for performing a process relative to HTTP which is generally used in apparatuses connected to the Internet, for example, a protocol stack for performing a process of HTTP. Therefore, it is convenient.

The illustrative embodiments of the present invention have been described above; however, the illustrative embodiments are mealy examples, and do not limit the scope of claims. The technologies described in the scope of claims include various changes and modifications of specific illustrative embodiments to be exemplified below. For example, the following modifications are included.

<Modifications>

In a case that an XMPP connection is established between the multi-function device 10 and the relay server 60 in STEP S236, and in this state, the time-up time elapses ("YES" in STEP S234), the multi-function device 10 may not perform the process of STEP S233 to establish an XMPP session between the multi-function device 10 and the relay server 60, nor perform the process of STEP S241 to transmit the survival notification information. In this case, if the time-up time elapses, the multi-function device 10 may perform the process of STEP S236 to establish an XMPP connection between the multi-function device 10 and the relay server 60. Further, in this case, if the time-up time elapses, the multi-function device 10 may perform the process of STEP S233 to establish a new XMPP session between the multi-function device 10 and the relay server 60.

The device ID inquiry information which is information to be transmitted from the service server may include the account ID or the like of the user of the push service. In this case, in STEP S347, the CPU 72 of the relay server 60 may detect the device ID of a multi-function device corresponding to the account ID, from the device database 76, on the basis of identification information, such as the account ID, included in the device ID inquiry information. The first request information to be transmitted from the service server may include the account ID or the like. In this case, the CPU 72 of the relay server 60 may detect the device ID of a multi-function device corresponding to the account ID, from the device database 76, on the basis of the identification information, such as the account ID, included in the first request information. In STEP S349, the CPU 72 may specify the multi-function device corresponding to the account ID, as a communication destination multi-function device which is a multi-function device which is the transmission destination of the first request information, and determine whether the specified multi-function device is offline.

In STEP S355, the CPU 72 of the relay server 60 may generate second request information by using the first request information, received from the service server, as it is. Alternatively, the CPU 72 may convert the received first request information into data which the multi-function devices 10 and 11 can grasp as request information, and then generate second request information.

In the first operation example of the communication system 2, a case that the process of STEP S375 to transmit the HTTP response to the multi-function device 10 is performed after the process of STEP S373 to transmit the response information to the service server has been described. However, the present invention is not limited to this form. The order of those processes may be reversed.

The request information is not limited to a GET request and a SET request, and may be other kinds of request information.

Multi-function devices to be connected to the relay server 60 such that communication is possible are not limited to the multi-function devices 10 and 11, and there may be three or more multi-function devices.

A service server to be connected to the Internet 6 is not limited to the service server 100, and there may be two or more service servers. As apparatuses which use the push service and the pull service, the multi-function devices 10 and 11 have been exemplified. However, the present invention is not limited thereto. Apparatuses which use the push service and the pull service may be sewing machines for embroidering a predetermined image or performing quilting on the basis of instruction data or the like. Apparatuses which use the push service and the pull service may be sewing machines for performing decorative stitching, sewing, or the like to form a work or a product based on image data. Apparatuses which use the push service and the pull service may be 3D printers for performing spraying, sharpening, and the like on the basis of instruction data or the like, thereby generating 3D images. Apparatuses which use the push service and the pull service may be work producing apparatuses or product manufacturing apparatuses for performing spraying, sharpening, and the like on the basis of image data or the like, thereby generating works or products. As an example of image data, 3D image data or 3D CAD data may be used. Apparatuses which use the push service and the pull service may be scanners for generating image data on the basis of transmitted data from sensors for optically or electrically detecting the contours of objects, or transmitted data from sensors attached to objects. Apparatuses which use the push service and the pull service may be scanners for generating data representing shapes or motions of objects on the basis of outputs from sensors. As an example of image data, video data or 3D image data may be used.

The multi-function devices 10 and 11 are examples of an image processing apparatus. The service servers 100 and 120 are examples of a server apparatus. The relay server 60 is an example of a relay apparatus. The CPUs 72 and 22 are examples of a processor. The CPU which performs STEP S343 is an example of a server-request-information receiving unit. The XMPP session establishment request information is an example of establishment request information. XMPP over BOSH is an example of a first protocol. HTTP is an example of a second protocol and a third protocol. The CPU which performs STEP S321 is an example of an establishment request information receiving unit. The GET request and SET request which are included in the first request information are examples of server request information. The CPU which performs STEP S355 is an example of a server-request-information transmitting unit. The LAN 4 is an example of a first network. The routers 7 and 8 are examples of a communication control apparatus. The Internet 6 is an example of a second network. The memory 74 is an example of a storage unit. The CPU which performs STEP S317 is an example of an image-processing-apparatus identification information transmitting unit. The CPU which performs STEP S369 is an example of a response information receiving unit. The CPU which performs STEP S373 is an example of a response information transmitting unit. The request ID is an example of first identification information. The CPU which performs STEP S353 is an example of a first identification information storage control unit. The CPU which performs STEP S351 is an example of an error information transmitting unit. The CPU which performs STEP S361 is an example of a third establishment request information receiving unit. The CPU which performs STEP S345 is an example of a second establishment request information receiving unit. The CPU which performs STEP S373 is an example of a connection specifying unit. The CPU which performs STEP S233 is an example of an establishment request information transmitting unit. The CPU which performs STEP S251 is an example of the server request information receiving unit. The CPU which performs STEP S241 is an example of a recognition request information transmitting unit. The CPU which performs STEP S244 is an example of a server recognition information receiving unit. The CPU which performs STEP S236 is an example of a second establishment request information transmitting unit. The CPU which performs STEP S241 is an example of the recognition request information transmitting unit. The CPU which performs STEP S265 is an example of a fourth establishment request information transmitting unit. The CPU which performs STEP S373 is an example of the response information transmitting unit. The CPU which performs STEP S217 or STEP S257 is an example of a related-information request information transmitting unit. The CPU which performs STEP S217 or STEP S257 is an example of a related-information receiving unit.

What is claimed is:

1. A relay apparatus comprising:
   a network interface configured to perform communication with an image processing apparatus and a server apparatus through a network;
   a processor; and
   memory storing instructions, the instructions, when executed by the processor, causing the relay apparatus to perform:
   in response to receiving, via the network interface, establishment request information transmitted from the image processing apparatus, establishing a session between the relay apparatus and the image processing apparatus according to a session establishment type first protocol for enabling server-push for transmitting the server request information to the image processing apparatus; and
   while the session according to the session establishment type first protocol for enabling server-push is established between the relay apparatus and the image processing apparatus in response to receiving the establishment request information:
   receiving, via the network interface, server request information transmitted from the server apparatus, the server request information representing a request to the image processing apparatus; and
   in response to receiving the server request information from the server apparatus, transmitting, via the network interface as part of a server-push process and without requiring any further request from the image processing apparatus other than the establishment request information, the server request information, received from the server apparatus, to the image processing apparatus by using the session established between the relay apparatus and the image processing apparatus according to the session establishment type first protocol for enabling server-push.

2. The relay apparatus according to claim 1,
   wherein the memory further stores instructions that, when executed by the processor, cause the relay apparatus to perform:
   receiving, via the network interface, response information transmitted from a communication destination image processing apparatus of the server request information in response to a request represented by the server request information; and transmitting, via the network interface, the response information to the server apparatus.

3. The relay apparatus according to claim 1, wherein the first protocol is eXtensible Messaging and Presence Protocol over Bidirectional-streams Over Synchronous HTTP.

4. A relay apparatus comprising:

a network interface configured to perform communication with an image processing apparatus and a server apparatus through a network, the relay apparatus configured to be connected to a second network, to which a first network is connected through a communication control apparatus;

a processor; and memory storing instructions, the instructions, when executed by the processor, causing the relay apparatus to perform:

receiving, via the network interface, server request information transmitted from the server apparatus not connected to the first network, the server request information representing a request to the image processing apparatus;

receiving, via the network interface, establishment request information transmitted from the image processing apparatus connected to the first network, the establishment request information requesting establishment of a session between the relay apparatus and the image processing apparatus according to a session establishment type first protocol for enabling server-push for transmitting the server request information to the image processing apparatus; and transmitting, via the network interface, the server request information to the image processing apparatus by using the session established between the relay apparatus and the image processing apparatus connected to the first network, in a case that the session between the relay apparatus and the image processing apparatus is established when the server request information is received, wherein the communication control apparatus is configured not to transmit request information to an apparatus connected to the first network, the request information having been transmitted from an apparatus connected to a network other than the first network to the apparatus connected to the first network without using the session.

5. The relay apparatus according to claim 4, wherein the relay apparatus is configured to be connected to the second network, to which a plurality of first networks is connected through communication control apparatuses provided in the plurality of first networks, respectively, wherein the instructions of receiving establishment request information further cause the relay apparatus to perform receiving, via the network interface, the establishment request information transmitted from a plurality of image processing apparatuses connected to the plurality of first networks, respectively, wherein the instructions of receiving server request information further cause the relay apparatus to perform receiving, via the network interface, specific server request information, the specific server request information having been transmitted from the server apparatus and corresponding to a communication destination image processing apparatus having been selected as a communication destination from the plurality of image processing apparatuses, and wherein, the instructions of transmitting server request information further cause the relay apparatus to perform transmitting the specific server request information to the communication destination image processing apparatus by using the session established between the relay apparatus and the communication destination image processing apparatus via the network interface, in a case that the establishment request information is received when the specific server request information is received.

6. The relay apparatus according to claim 5, wherein the memory further stores instructions that, when executed by the processor, cause the relay apparatus to perform:

transmitting an image-processing-apparatus identification information so as to be stored in a storage unit, the image-processing-apparatus identification information being for identifying a transmission source image processing apparatus that is the transmission source of the establishment request information, wherein the instructions of transmitting image-processing-apparatus identification information further cause the relay apparatus to perform storing, in the storage unit, a plurality of image-processing-apparatus identification information items corresponding to the plurality of image processing apparatuses, and wherein the instructions of transmitting server request information further cause the relay apparatus to perform transmitting, via the network interface, the server request information to a transmission source image processing apparatus by using the session, the transmission source image processing apparatus being represented by the image-processing-apparatus identification information included in the server request information.

7. A relay apparatus comprising:

a network interface configured to perform communication with an image processing apparatus and a server apparatus through a network;

a processor; and memory storing instructions, the instructions, when executed by the processor, causing the relay apparatus to perform:

receiving, via the network interface, server request information transmitted from the server apparatus, the server request information representing a request to the image processing apparatus;

receiving, via the network interface, establishment request information transmitted from the image processing apparatus, the establishment request information requesting establishment of a session between the relay apparatus and the image processing apparatus according to a session establishment type first protocol for enabling server-push for transmitting the server request information to the image processing apparatus; and transmitting, via the network interface, the server request information to the image processing apparatus by using the session established between the relay apparatus and the image processing apparatus, in a case that the session between the relay apparatus and the image processing apparatus is established when the server request information is received, wherein the relay apparatus receives the server request information from the server apparatus according to a second protocol that is different from the first protocol, and wherein the memory further stores instructions that, when executed by the processor, cause the relay apparatus to perform:
   receiving the server request information transmitted from the server apparatus by using a session-less type connection according to the second protocol that is a session-less type protocol.

8. The relay apparatus according to claim 7,
wherein the memory further stores instructions that, when executed by the processor, cause the relay apparatus to perform:
   receiving, via the network interface, response information transmitted from a communication destination image processing apparatus of the server request information in response to a request represented by the server request information; and
   transmitting, via the network interface, the response information to the server apparatus,
wherein the instructions of transmitting response information further cause the relay apparatus to perform:
   including the response information in response data compliant with the second protocol that is the session-less type protocol; and
   transmitting, via the network interface, the response data to the server apparatus by using a connection established between the relay apparatus and the server apparatus,
wherein the instructions of transmitting response information further cause the relay apparatus to perform receiving the response information from the communication destination image processing apparatus as information included in request data compliant with the session-less type protocol, and
wherein the memory further stores instructions that, when executed by the processor, cause the relay apparatus to perform:
   transmitting the response data compliant with the session-less type protocol to the communication destination image processing apparatus in response to receiving the response information.

9. The relay apparatus according to claim 8,
wherein the memory further stores instructions that, when executed by the processor, cause the relay apparatus to perform:
   in response to receiving specific server request information from the server apparatus, the specific server request information being server request information corresponding to a communication destination image processing apparatus that is an image processing apparatus selected as a communication destination from a plurality of image processing apparatuses, storing first identification information for identifying the received specific server request information in a storage unit so as to distinguish the specific server request information from other server request information,
wherein the instructions of transmitting server request information further cause the relay apparatus to perform transmitting the first identification information together with the specific server request information to the communication destination image processing apparatus,
wherein the instructions of receiving response information further cause the relay apparatus to perform receiving second identification information from the communication destination image processing apparatus, the second identification information being for identifying specific server request information that is an origin of the response information together with the response information,
wherein the memory further stores instructions that, when executed by the processor, cause the relay apparatus to perform:
   specifying a connection used for transmission of specific server request information corresponding to the response information received from the server apparatus side, on the basis of the second identification information and the first identification information, in a case that the second identification information is received together with the response information, and
wherein the instructions of transmitting response information further cause the relay apparatus to perform:
   including the response information in response data compliant with the second protocol; and
   transmitting the response data to the server apparatus by using the connection specified by the connection specifying unit.

10. The relay apparatus according to claim 9,
wherein the memory further stores instructions that, when executed by the processor, cause the relay apparatus to perform:
   transmitting error information to the server apparatus through the session-less type connection established between the relay apparatus and the image processing apparatus on a condition that the session between the relay apparatus and the communication destination image processing apparatus has not been established, in a case that the specific server request information corresponding to the communication destination image processing apparatus has been received from the server apparatus,
wherein the request information is included in request data corresponding to the session-less type connection, and
wherein the error information is included in response data corresponding to the session-less type connection.

11. The relay apparatus according to claim 10,
wherein the memory further stores instructions that, when executed by the processor, cause the relay apparatus to perform:
   generating the first identification information corresponding to the request information in response to receiving the request information from the server apparatus,
wherein the instructions of storing first identification information further cause the relay apparatus to perform storing the first identification information generated by the generating first identification information in the storage unit,
wherein the instructions of transmitting server request information further cause the relay apparatus to perform transmitting the first identification information generated by the generating first identification information together with the specific server request information received by the receiving server request information to the communication destination image processing apparatus, and
wherein in a case that the receiving response information receives the second identification information together with the response information, on a condition that the first identification information stored in the storage unit and the second identification information received by the receiving response information coincide with each other, the instructions of specifying connection further cause the relay apparatus to perform specifying a connection used for transmission of request information corresponding to the first identification information from the server apparatus.

12. The relay apparatus according to claim 7,
wherein the second protocol is Hypertext Transfer Protocol.

13. A relay apparatus comprising:
a network interface configured to perform communication with an image processing apparatus and a server apparatus through a network;
a processor; and
memory storing instructions, the instructions, when executed by the processor, causing the relay apparatus to perform:
receiving, via the network interface, server request information transmitted from the server apparatus, the server request information representing a request to the image processing apparatus;
receiving, via the network interface, establishment request information transmitted from the image processing apparatus, the establishment request information requesting establishment of a session between the relay apparatus and the image processing apparatus according to a session establishment type first protocol for enabling server-push for transmitting the server request information to the image processing apparatus;
transmitting, via the network interface, the server request information to the image processing apparatus by using the session established between the relay apparatus and the image processing apparatus, in a case that the session between the relay apparatus and the image processing apparatus is established when the server request information is received;
receiving, via the network interface, response information transmitted from a communication destination image processing apparatus of the server request information in response to a request represented by the server request information; and
transmitting, via the network interface, the response information to the server apparatus,
wherein the instructions of receiving response information further cause the relay apparatus to perform receiving information, which is included in data transmitted by a communication destination image processing apparatus of the server request information to the relay apparatus and in compliance with a third protocol that is different from the first protocol, as the response information,
wherein the instructions of transmitting response information further cause the relay apparatus to perform transmitting, via the network interface, the response information to the server apparatus,
wherein the memory further stores instructions that, when executed by the processor, cause the relay apparatus to perform:
receiving, via the network interface, third establishment request information transmitted from a communication destination image processing apparatus of the server request information,
wherein the instructions of receiving response information further cause the relay apparatus to perform receiving information, which is included in request data compliant with a session-less type connection according to the third protocol which is a session-less type protocol, as the response information,
wherein the instructions of transmitting response information further cause the relay apparatus to perform transmitting, via the network interface, the response information to the server apparatus,
wherein the memory further stores instructions that, when executed by the processor, cause the relay apparatus to perform:
receiving, via the network interface, second establishment request information transmitted from the server apparatus, the second establishment request information requesting establishment of a session-less type connection according to a second protocol that is also a session-less protocol between the relay apparatus and the server apparatus,
wherein the instructions of receiving server request information further cause the relay apparatus to perform receiving the server request information transmitted from the server apparatus by using the session-less type connection established between the relay apparatus and the server apparatus,
wherein the instructions of transmitting server request information further cause the relay apparatus to perform, transmitting, via the network interface, the server request information to the image processing apparatus by using the session established between the relay apparatus and the image processing apparatus, in a case that the session-less type connection between the relay apparatus and the server apparatus is established, and
wherein the instructions of transmitting response information further cause the relay apparatus to perform:
including the response information in response data compliant with the second protocol that is the session-less type protocol; and
transmitting, via the network interface, the response data to the server apparatus by using the connection established between the relay apparatus and the server apparatus.

14. The relay apparatus according to claim 13,
wherein the third protocol is Hypertext Transfer Protocol.

15. An image processing apparatus comprising:
a network interface configured to perform communication with a relay apparatus, which is configured to perform communication with a server apparatus, through a network;
a processor; and
memory storing instructions, the instructions, when executed by the processor, causing the image processing apparatus to perform:
transmitting, to the relay apparatus, establishment request information and establishing a session between the relay apparatus and the image processing apparatus according to a session establishment type first protocol for enabling server-push to transmit information from the server apparatus; and
while the session according to the session establishment type first protocol for enabling the server-push is established between the relay apparatus and the image processing apparatus, and in response to the relay apparatus receiving server request information from the server apparatus, the server request information representing a request relative to the image processing apparatus, receiving, without requiring any further request from the image processing apparatus other than the establishment request information for establishing the session enabling server-push, the server request information, which the relay apparatus has received from the server apparatus, from the relay apparatus through a server-push process via the network interface by using the session established between the relay apparatus and the image processing apparatus.

16. The image processing apparatus according to claim 15, wherein the memory further stores instructions that, when executed by the processor, cause the image processing apparatus to perform:
- transmitting, via the network interface, fourth establishment request information to the relay apparatus, the fourth request information being for requesting establishment of a session-less type connection, which is a connection according to a third protocol that is a session-less type protocol, between the image processing apparatus and the relay apparatus, in response to receiving the server request information;
- generating response information corresponding to a request represented by the server request information; and
- transmitting, via the network interface, the generated response information to the relay apparatus by using the session-less type connection established between the image processing apparatus and the relay apparatus, wherein the instructions of receiving server request information further cause the image processing apparatus to perform receiving first identification information for identifying the server request information together with the server request information from the relay apparatus, and wherein the instructions of transmitting response information further cause the image processing apparatus to perform transmitting the first identification information received by the receiving server request information together with the response information to the relay apparatus.

17. The image processing apparatus according to claim 15, wherein the instructions of transmitting establishment request information further cause the image processing apparatus to perform transmitting the establishment request information to the relay apparatus on the basis of session maintenance information for establishing the session stored in a storage unit, on a condition that the image processing apparatus is in a session maintenance mode, wherein the memory further stores instructions, when executed by the processor, causing the image processing apparatus to perform:
- setting mode information stored in a storage unit, the mode information representing whether the image processing apparatus is in the session maintenance mode, wherein the instructions of transmitting establishment request information further cause the image processing apparatus to perform transmitting the establishment request information to the relay apparatus, on a condition that the mode information stored in the storage unit represents that the image processing apparatus is in the session maintenance mode when the image processing apparatus is activated, and wherein the instructions of transmitting establishment request information further cause the image processing apparatus to perform determining whether the image processing apparatus is in the session maintenance mode, on the basis of the mode information stored in the storage unit during manufacturing of the image processing apparatus.

18. The image processing apparatus according to claim 15, wherein the memory further stores instructions that, when executed by the processor, cause the image processing apparatus to perform:
- in response to receiving instruction information for instructing use of a pull service provided by the server apparatus, transmitting, via the network interface, related-information request information to the server apparatus by using a second protocol that is a lower-level protocol than the first protocol, the related-information request information being for requesting the server apparatus to transmit related information corresponding to use of the pull service; and
- receiving, via the network interface, the related information transmitted from the server apparatus, wherein the instructions of transmitting establishment request information further cause the image processing apparatus to perform transmitting, via the network interface, the establishment request information to the relay apparatus by using the second protocol that is a lower-level protocol than the first protocol, and wherein the instructions of receiving server request information further cause the image processing apparatus to perform receiving, via the network interface, the server request information transmitted from the relay apparatus for performing the server-push by using the second protocol in the session established between the relay apparatus and the image processing apparatus.

19. The image processing apparatus according to claim 18, wherein the first protocol is eXtensible Messaging and Presence Protocol over Bidirectional-streams Over Synchronous HTTP, and wherein the second protocol is Hypertext Transfer Protocol.

20. An image processing apparatus comprising:
- a network interface configured to perform communication with a relay apparatus, which is configured to perform communication with a server apparatus, through a network;
- a processor; and
- memory storing instructions, the instructions, when executed by the processor, causing the image processing apparatus to perform:
  - transmitting establishment request information to the relay apparatus, the establishment request information requesting establishment of a session between the relay apparatus and the image processing apparatus according to a session establishment type first protocol for enabling server-push to transmit information from the server apparatus; and
  - after establishment of the session, receiving server request information from the relay apparatus via the network interface by using the session established between the relay apparatus and the image processing apparatus, the server request information representing a request corresponding to the image processing apparatus which the relay apparatus has received from the server apparatus and having been transmitted by the relay apparatus for performing the server-push, wherein the memory further stores instructions that, when executed by the processor, cause the image processing apparatus to perform:
- a state maintenance process for maintaining a state in which the server-push is possible, on a condition that a predetermined time elapses while the server request information, which has been transmitted from the relay apparatus for performing the server-push, has not been received after transmitting the establishment request information for enabling the server-push from the relay apparatus, wherein the instructions of performing a state maintenance process further cause the image processing apparatus to perform:

transmitting, via the network interface, recognition request information to the relay apparatus, the recognition request information being for requesting the relay apparatus to reply with recognition information representing that the relay apparatus has recognized that a session for enabling the server-push has been established, on the condition that the predetermined time has elapsed while the server request information, which has been transmitted from the relay apparatus for performing the server-push, has not been received after transmitting the establishment request information for enabling the server-push from the relay apparatus; and receiving, via the network interface, the recognition information, with which the relay apparatus has replied to the image processing apparatus, and wherein in a case that the recognition information cannot be received, the instructions of performing a state maintenance process further cause the image processing apparatus to perform transmitting the establishment request information for maintaining the state in which the server-push is possible.

21. The image processing apparatus according to claim 20, wherein the memory further stores instructions that, when executed by the processor, cause the image processing apparatus to perform:

transmitting, via the network interface, second establishment request information to the relay apparatus, in a case that the transmitting establishment request information has transmitted establishment request information and establishes a session for enabling the server-push from the relay apparatus, the second establishment request information being information for establishing a session establishment type connection, which is a connection using the session for enabling the server-push from the relay apparatus, between the image processing apparatus and the relay apparatus, wherein the instructions of the receiving server request information further cause the image processing apparatus to perform, after establishment of the session establishment type connection using the session, receiving, via the network interface, the server request information transmitted from the relay apparatus for performing the server-push by using the session establishment type connection established between the relay apparatus and the image processing apparatus, wherein the instructions of the performing state maintenance process further cause the image processing apparatus to perform:

transmitting, via the network interface, recognition request information to the relay apparatus, the recognition request information being for requesting the relay apparatus to reply with recognition information representing that the relay apparatus has recognized that a session for enabling the server-push has been established, on a condition that a predetermined time has elapsed while the server request information, which has been transmitted from the relay apparatus for performing the server-push, has not been received after transmitting the establishment request information and establishing the session according to the session establishment type connection for enabling the server-push from the relay apparatus is established; and receiving, via the network interface, the recognition information, with which the relay apparatus has replied to the image processing apparatus, and wherein in a case that the receiving server recognition information receives the recognition information, the instructions of performing a state maintenance process further cause the image processing apparatus to perform controlling the transmitting second establishment request information to transmit the second establishment request information for maintaining the state in which the server-push is possible.

22. A communication system comprising:

a plurality of image processing apparatuses;

a server apparatus;

a relay apparatus, wherein the relay apparatus is configured to couple to the plurality of image processing apparatuses and the server apparatus through a network;

a processor; and memory storing instructions, the instructions, when executed by the processor, causing the processor to perform:

in response to requests for session establishment from the plurality of image processing apparatuses to the relay apparatus, establishing a plurality of sessions for enabling server-push for transmitting information from the server apparatus according to a session establishment type first protocol between the relay apparatus and the plurality of image processing apparatuses;

while the plurality of sessions according to the session establishment type first protocol for enabling the server-push are established between the relay apparatus and the plurality of image processing apparatuses:

in response to the relay apparatus receiving specific server request information from the server apparatus and without requiring any further request from the plurality of image processing apparatuses other than the requests for session establishment for establishing the plurality of sessions enabling server-push, transmitting, in a server-push process, the specific server request information being corresponding to a communication destination image processing apparatus selected as a communication destination from the plurality of image processing apparatus by the server apparatus, the specific server request information from the relay apparatus to the communication destination image processing apparatus through the corresponding session; and in response to the relay apparatus receiving response information corresponding to the specific server request information from the communication destination image processing apparatus, transmitting the response information to the server apparatus from the relay apparatus.

* * * * *